(12) United States Patent
Inoue et al.

(10) Patent No.: US 11,233,398 B2
(45) Date of Patent: Jan. 25, 2022

(54) DISTRIBUTED POWER SUPPLY SYSTEM

(71) Applicant: Mitsubishi Electric Corporation, Chiyoda-ku (JP)

(72) Inventors: Sadayuki Inoue, Chiyoda-ku (JP); Takahiro Kato, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 135 days.

(21) Appl. No.: 16/635,629

(22) PCT Filed: May 10, 2018

(86) PCT No.: PCT/JP2018/018174
§ 371 (c)(1),
(2) Date: Jan. 31, 2020

(87) PCT Pub. No.: WO2019/053941
PCT Pub. Date: Mar. 21, 2019

(65) Prior Publication Data
US 2020/0274357 A1    Aug. 27, 2020

(30) Foreign Application Priority Data
Sep. 12, 2017    (JP) .............................. JP2017-174718

(51) Int. Cl.
| | |
|---|---|
| *H02J 7/00* | (2006.01) |
| *H02J 3/16* | (2006.01) |
| *H02S 40/32* | (2014.01) |
| *H02S 40/38* | (2014.01) |
| *G05F 1/70* | (2006.01) |

(52) U.S. Cl.
CPC .................. *H02J 3/16* (2013.01); *G05F 1/70* (2013.01); *H02J 7/00712* (2020.01); *H02S 40/32* (2014.12); *H02S 40/38* (2014.12); *H02J 2300/26* (2020.01)

(58) Field of Classification Search
USPC ................................. 320/316, 317, 318, 319
See application file for complete search history.

(56) References Cited

U.S. PATENT DOCUMENTS

2016/0204614 A1 *   7/2016   Itaya ................. H02J 13/00006
                                                                                                        307/82

FOREIGN PATENT DOCUMENTS

| JP | 2011-55656 A | 3/2011 | |
|---|---|---|---|
| JP | 2013118804 A * | 6/2013 | ............. G06Q 50/06 |

(Continued)

OTHER PUBLICATIONS

International Search Report dated Jun. 19, 2018 in PCT/JP2018/018174 filed on May 10, 2018.

*Primary Examiner* — Brian Ngo
(74) *Attorney, Agent, or Firm* — Xsensus LLP

(57) ABSTRACT

When the AC voltage effective value at an interconnection point is higher than a first threshold voltage, a solar-panel power conversion device controls an output of reactive power so that the voltage at the interconnection point matches a first target effective voltage. When the power generated from an energy creation apparatus is higher than a first reference power and the AC voltage effective value at the interconnection point is higher than a second threshold voltage, then a storage-battery power conversion device controls an output of reactive power so that the voltage at the interconnection point matches a second target effective voltage.

6 Claims, 16 Drawing Sheets

(56) References Cited

FOREIGN PATENT DOCUMENTS

| | | | |
|---|---|---|---|
| JP | 2014158327 A | * | 8/2014 |
| JP | 2014-192992 A | | 10/2014 |
| JP | 2015-39262 A | | 2/2015 |

* cited by examiner

DISTRIBUTED POWER SUPPLY SYSTEM

TECHNICAL FIELD

The present invention relates to a distributed power supply system, particularly to a method for controlling an energy creation apparatus that harnesses renewable energy (e.g., a solar panel) and an energy storage apparatus (e.g., a storage battery) in a distributed power supply system, where the energy creation apparatus is connected to the energy storage apparatus via alternating current.

BACKGROUND ART

In recent years, in order to reduce environmental load, power generation systems that harness natural energy, such as solar panels with no carbon dioxide emission, are spreading among families. Also, products have been developed to address power shortage since the Great East Japan Earthquake. Examples of such products include: systems provided with storage batteries, systems using electric vehicles as storage batteries, and systems combining solar panels and storage batteries. Further, for a large reduction in carbon dioxide emission, the government has been promoting zero-emission houses (hereinafter also referred to as ZEH houses or simply ZEHs). The zero-emission houses are well insulated and provided with an energy creation apparatus that harnesses renewable energy (e.g., a solar panel), so that the power consumption and power generation balance out in one year.

With a large amount of renewable energy from a solar panel, the voltage of the distribution system may increase during the daytime with a large insolation amount, as described above. As solutions to such a problem, for example, the power generation from the solar panel is restrained to reduce the reverse power, or a static VAR compensator (SVC) or a storage battery facility for system stabilization is used to compensate the voltage increase. Such solutions, however, cannot fully use the power available from the solar panel, or require an expensive system stabilization facility, such as an SVC. As the solutions, the government started subsidiary enterprises for increasing in-house consumption of generated power (local production for local consumption) in 2016, and plans to promote the enterprises in the future. As to the enterprises for promoting the above-described ZEH houses, in order to promote local production for local consumption, the government started subsidizing storage batteries unrelated to the ZEH conditions in 2016 to make them more popular.

In recent years, a large-scale town development called "vacant lot development" has been promoted which utilizes the site of a factory (e.g., the Sustainable Smart Town in Fujisawa City, Kanagawa Prefecture), the site of Kyushu University, etc. In such development, a solar panel is installed in each house in some cases. Also, according to the guideline of the government as described above, the future town development will be on the premise of using the ZEH houses (each having an energy creation apparatus (e.g., solar panel) with several kW). In this case, for a town size with about 300 houses, a mega solar plant is formed. In order to stabilize the distribution system (restrain the increase in system voltage), the conventional techniques would require installation of an expensive system facility in the town, such as an SVC or storage battery, as described above. Further, in each house, when the voltage of the distribution system increases, an electric power conversion device (hereinafter referred to as a power conversion device) connected to the solar panel is controlled to output reactive power to restrain the system voltage. With this control, the power generation from the solar panel may have to be restrained due to the increase in apparent power caused by the reactive power. The town as described above (hereinafter referred to as a smart town) introduces a facility for stabilizing the distribution system voltage, such as an SVC or distribution-system storage battery as described above, so as to restrain the increase in system voltage that would be caused by the power generation from the solar panel installed in each consumer. However, each consumer may have to bear a part of the cost for introducing such a facility in some cases.

PTL 1 describes a power generation system including: a power generator that harnesses renewable energy, a first inverter connected to the power generator, a storage battery, a second inverter connected to the storage battery, and a controller. In this power generation system, the first inverter and the second inverter are connected at an interconnection point, and the controller controls the power supply to a load via the interconnection point. The controller changes the ratio between the reactive power output from the first inverter and the reactive power output from the second inverter, based on the active power output from the second inverter connected to the storage battery. The control method for stabilizing the system voltage described in PTL 1 determines the amount of reactive power from an energy creation apparatus based on the information on the active power from a storage-battery power conversion device. Specifically, the energy creation apparatus is a wind generator for example, and when the active power output from the storage-battery power conversion device approaches the rated power of the storage-battery power conversion device, the controller of the energy creation apparatus increases the reactive power output from the energy creation apparatus by adjusting the ratio of reactive power between the energy creation apparatus and the storage-battery power conversion device. This prevents an overload on the storage-battery power conversion device and improves the utilization rate of the inverter.

CITATION LIST

Patent Literature

PTL 1: Japanese Patent Laying-Open No. 2014-192992

SUMMARY OF INVENTION

Technical Problem

The Grid-interconnection Code specifies that the power factor of the low-voltage system is equal to or higher than 0.85. Accordingly, the reactive power that can be output from the solar-panel power conversion device is up to $(1.0-0.85 \times 0.85)^{1/2} \times Pmax$ (i.e., $0.526 \times Pmax$), where Pmax denotes the rated power. For example, if the solar-panel power conversion device has a rated power of 6 kW and the storage-battery power conversion device has a rated power of 2 kW (the storage battery has 2 kWh), the storage-battery power conversion device can output reactive power of up to 2 kW. Accordingly, if the increase in system voltage can be restrained with reactive power of up to 2 kW, the solar panel can output all the generated power as active power. With the control described in PTL 1, however, even in this case, the solar panel or energy creation apparatus is configured to output reactive power. Thus, not all the power generated from the energy creation apparatus can be output as active power, and the power generation from the energy creation apparatus may have to be restrained.

The present invention has been made to solve the above-described problems. An object of the present invention is to provide a distributed power supply system that can reduce the occurrence of restraint on the power generation from the energy creation apparatus.

Solution to Problem

The present invention provides a distributed power supply system in which a plurality of distributed power supplies each including an energy creation apparatus are connected to a distribution system at one interconnection point so as to supply power to a power system, at least one of the plurality of distributed power supplies including a storage battery, and an inverter to convert DC power from the storage battery into AC power. The distributed power supply system includes: a voltage meter to measure an AC voltage at the interconnection point; a power generation meter to measure power generated from the energy creation apparatus; and a controller to control the inverter to convert DC power from the storage battery into AC power. When the controller controls the inverter, the controller has: a first system voltage target value to be used when the AC voltage at the interconnection point is within a prescribed range, a second system voltage target value to be used to determine whether to output reactive power from the inverter for restraining an increase in the AC voltage at the interconnection point, and a first system voltage threshold voltage to be used to determine whether to use the inverter to control a system voltage, based on an output from the power generation meter. When the output from the power generation meter is equal to or higher than a prescribed value and an output from the voltage meter is higher than the first system voltage threshold voltage, the controller controls an output of the reactive power from the inverter so that the system voltage matches the second system voltage target value.

Advantageous Effects of Invention

According to the present invention, when the output from the power generation meter is equal to or higher than a prescribed value and the output from the voltage meter is higher than the first system voltage threshold voltage, the output of the reactive power from the inverter is controlled so that the system voltage matches the second system voltage target value. This can reduce the occurrence of restraint on the power generation from the energy creation apparatus, as compared to the case in which the energy creation apparatus alone outputs reactive power.

DESCRIPTION OF EMBODIMENTS

Embodiments will now be described with reference to the drawings.

Embodiment 1

Figure 1:
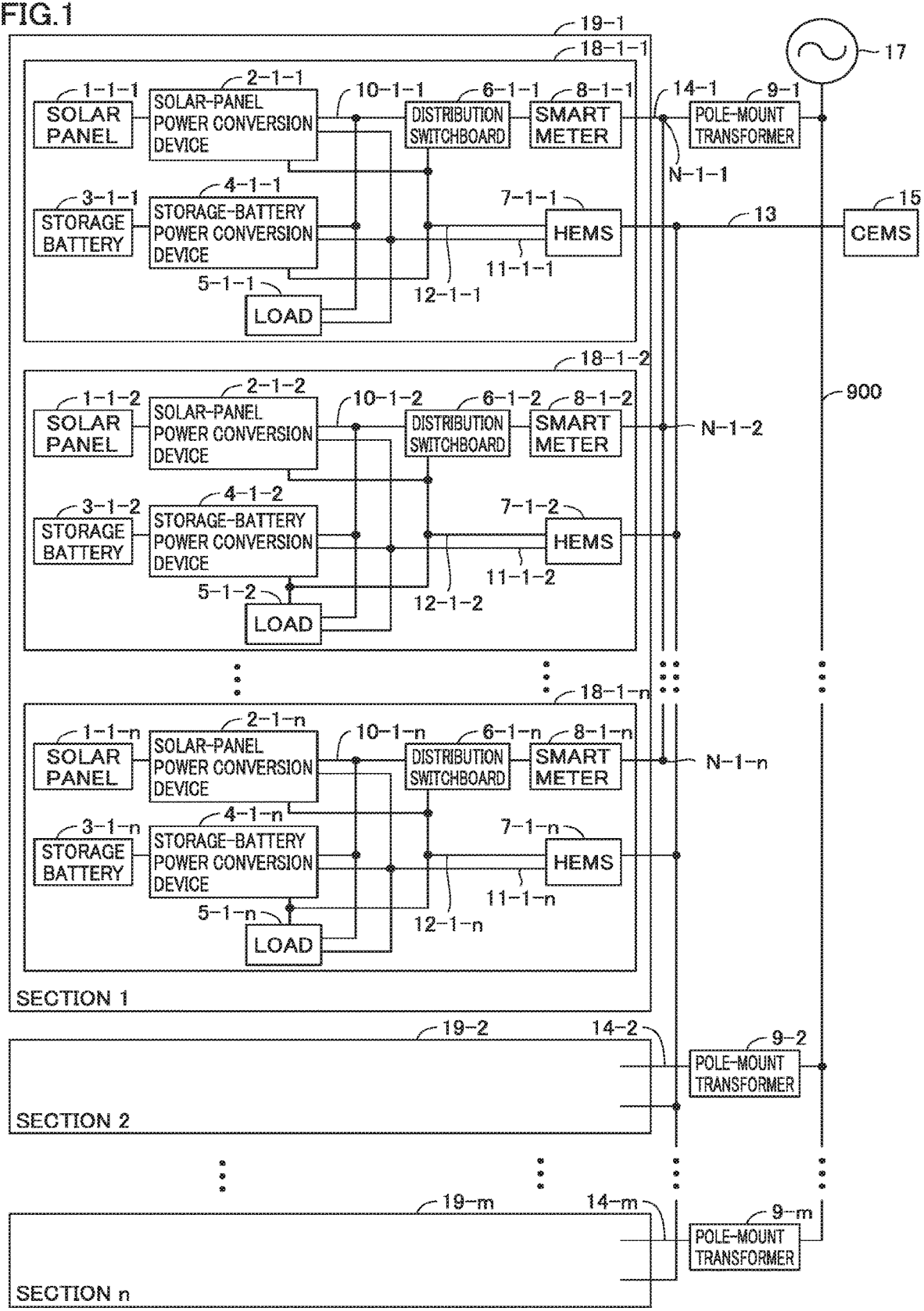
FIG. 1 is a diagram showing a configuration of a distributed power supply system in embodiment 1.

FIG. 1 is a diagram showing a configuration of a distributed power supply system in embodiment 1. In this distributed power supply system, a plurality of distributed power supplies are connected to a commercial system at interconnection points.

With reference to FIG. 1, the distributed power supply system includes pole-mount transformers 9-1 to 9-$m$, a plurality of sections 19-1 to 19-$m$, distribution systems 14-1 to 14-$m$ for supplying power to the plurality of sections, a community energy management system (CEMS) 15, and an outside premises communication network 13. The number m of the sections is, for example, 30.

CEMS 15 manages the demand and supply of power in sections 19-1 to 19-$m$.

Section 19-$j$ is configured with consumer equipment 18-$j$-1 to 18-$j$-$n$ installed in consumer houses. The number n of consumer houses in one section is, for example, 10.

A description will now be given to a case in which a smart town is constituted of a plurality of sections (e.g., about 30 sections), each section being constituted of a plurality of consumers (e.g., about 10 consumers) under pole-mount transformers 9-1 to 9-$m$.

Here, the consumer house is a ZEH (Zero Emission House) house. The ZEH house refers to a house well insulated and provided with an energy creation apparatus that harnesses renewable energy (e.g., a solar panel), so that the power consumption and power generation balance out in one year for a large reduction in carbon dioxide emission. A description is given to a case in which all the houses have their respective solar panels 1 (having a capacity of about 4 to 6 kW) to constitute a mega solar plant.

Consumer equipment 18-*j*-1 to 18-*j*-*n* can be connected to a commercial system 17 at interconnection points N-j-1 to N-j-n.

Consumer equipment 18-*j*-*i* includes a solar panel 1-*j*-*i*, a solar-panel power conversion device 2-*j*-*i*, a storage battery 3-*j*-*i*, a storage-battery power conversion device 4-*j*-*i*, a load 5-*j*-*i* in the consumer premises, a distribution switchboard 6-*j*-*i*, a HEMS 7-*j*-*i*, a smart meter 8-*j*-*i*, a consumer premises distribution system 10-*j*-*i*, a consumer premises communication network 11-*j*-*i*, and a signal line 12-*j*-*i*.

Outside premises communication network 13 connects CEMS 15 and HEMS 7-*j*-*i* (j=1 to m, i=1 to n).

A plurality of sets of consumer equipment 18-*j*-1 to 18-*j*-*m* are connected to an interconnection line 900 via pole-mount transformer 9-*j*. Interconnection line 900 is connected to commercial system 17. Thus, one or more distributed power supplies included in a plurality of sets of consumer equipment 18-*j*-1 to 18-*j*-*n* are connected to commercial system 17.

In the following description, the above-described component X-j-i is generically denoted by X.

Figure 2:
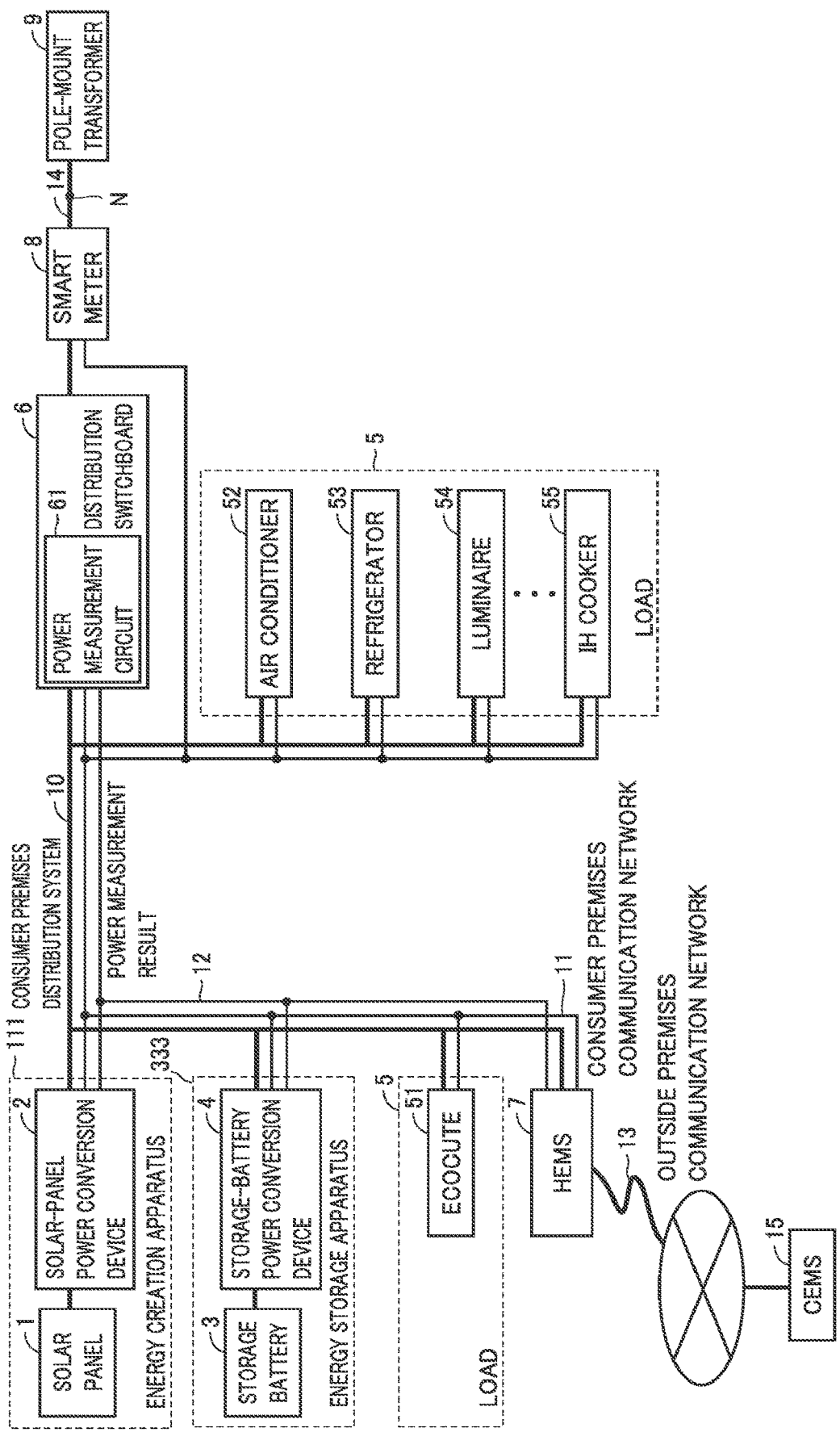
FIG. 2 is a diagram showing a configuration of consumer equipment 18.

FIG. 2 is a diagram showing a configuration of consumer equipment 18. In FIG. 2, like numerals refer to like elements. Consumer equipment 18 includes an energy creation apparatus 111 and an energy storage apparatus 333, as distributed power supplies.

Energy creation apparatus 111 includes a solar panel 1 as an energy creation device, and solar-panel power conversion device 2. The energy creation device is not limited to solar panel 1, but may be a wind generator, a hydraulic generator, or the like. Solar-panel power conversion device 2 corresponds to a first power conversion device.

Solar panel 1 has a capacity of about 4 to 6 kW. As shown in FIG. 1, 10 consumers constitute a section, and 30 sections constitute a mega solar plant.

Solar-panel power conversion device 2 converts DC power supplied from solar panel 1 into AC power, and supplies the AC power to consumer premises distribution system 10.

Energy storage apparatus 333 includes storage battery 3 and storage-battery power conversion device 4.

Storage battery 3 is configured to be charged and discharged.

Storage-battery power conversion device 4 converts DC power discharged from storage battery 3 into AC power, and supplies the AC power to consumer premises distribution system 10. Storage-battery power conversion device 4 converts AC power supplied from consumer premises distribution system 10 into DC power to charge storage battery 3 with the DC power. Storage-battery power conversion device 4 corresponds to a second power conversion device. Storage-battery power conversion device 4 corresponds to an inverter.

Load 5 includes, for example, an EcoCute 51, an air conditioner 52, a refrigerator 53, a luminaire 54, and an IH cooker 55.

HEMS 7 is connected to CEMS 15 via outside premises communication network 13.

Distribution switchboard 6 provides power, supplied from commercial system 17 through pole-mount transformer 9, to consumer premises distribution system 10. Distribution switchboard 6 includes a power measurement circuit 61. Power measurement circuit 61 measures power of each breaker.

Smart meter 8 measures the usage of power from commercial system 17.

Consumer premises distribution system 10 supplies power to the devices in the consumer premises.

Consumer premises communication network 11 transmits, for example, the control information between HEMS 7 and the devices in the consumer premises.

Signal line 12 transmits a signal representing the power measured by the power measurement circuit 61 in distribution switchboard 6.

Figure 3:
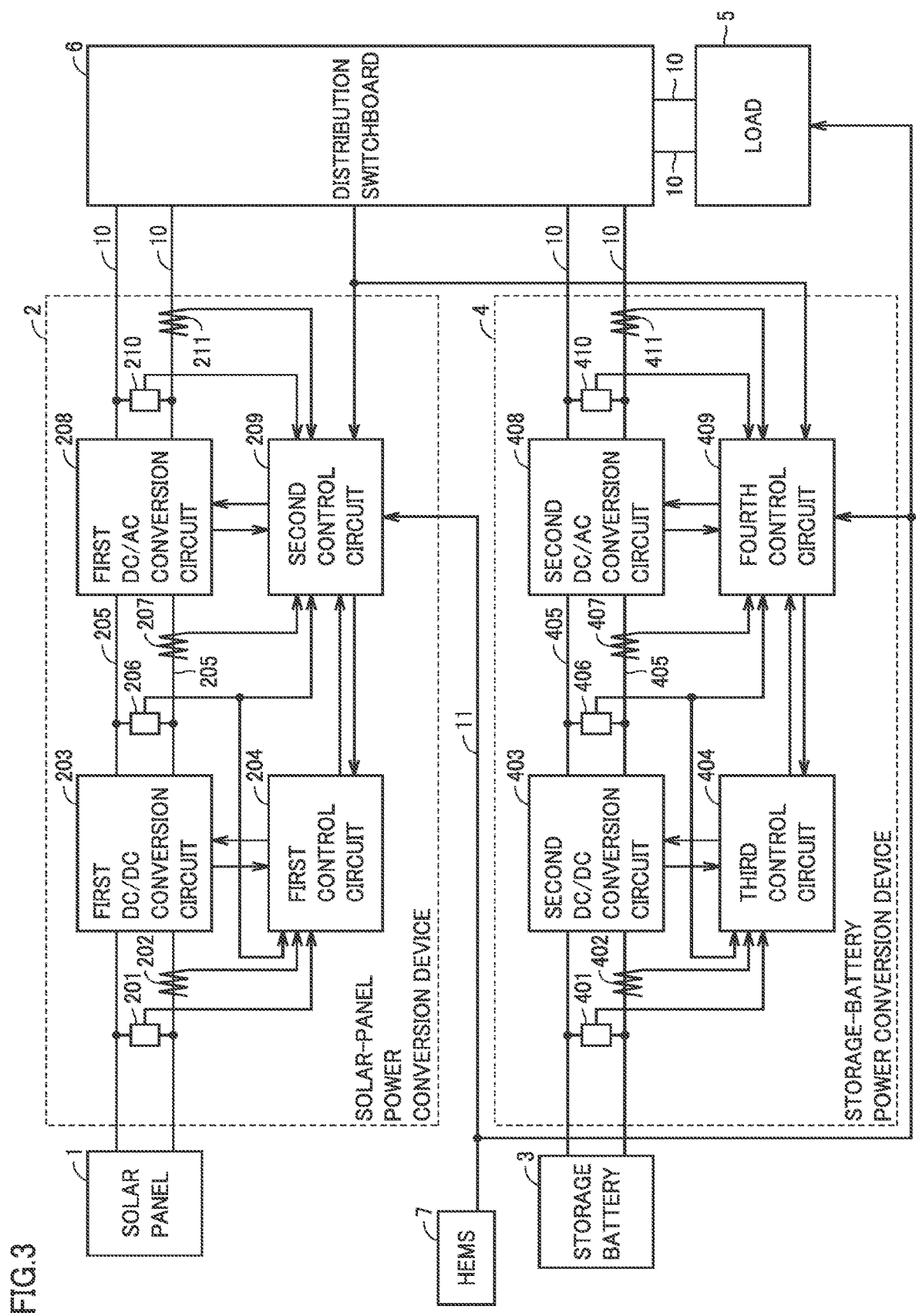
FIG. 3 is a diagram showing configurations of a solar-panel power conversion device 2 and a storage-battery power conversion device 4.

FIG. 3 is a diagram showing configurations of solar-panel power conversion device 2 and storage-battery power conversion device 4.

Solar-panel power conversion device 2 includes a voltmeter 201, an ammeter 202, a first DC/DC conversion circuit 203, a first control circuit 204, a DC bus 205, a voltmeter 206, an ammeter 207, a first DC/AC conversion circuit 208, a second control circuit 209, a voltmeter 210, and an ammeter 211.

Voltmeter 201 measures a first DC voltage output from solar panel 1.

Ammeter 202 measures a first DC current output from solar panel 1.

First DC/DC conversion circuit 203 converts the first DC voltage output from solar panel 1 into a second DC voltage.

DC bus 205 supplies the second DC voltage output from first DC/DC conversion circuit 203 to first DC/AC conversion circuit 208.

Voltmeter 206 measures the second DC voltage on DC bus 205.

Ammeter 207 measures a second DC current in DC bus 205.

First DC/AC conversion circuit 208 converts the second DC voltage (DC power) output from first DC/DC conversion circuit 203 into an AC voltage (AC power), and outputs the AC voltage (AC power) to consumer premises distribution system 10.

Voltmeter 210 measures the AC voltage of consumer premises distribution system 10 as the AC voltage at interconnection point N.

Ammeter 211 measures the AC current flowing through consumer premises distribution system 10.

First control circuit 204 controls first DC/DC conversion circuit 203 based on, for example, the output from voltmeter 201, the output from ammeter 202, and the output from voltmeter 206.

Second control circuit 209 controls first DC/AC conversion circuit 208 based on, for example, the output from voltmeter 206, the output from ammeter 207, the output from voltmeter 210, and the output from ammeter 211.

Storage-battery power conversion device 4 includes a voltmeter 401, an ammeter 402, a second DC/DC conversion circuit 403, a third control circuit 404, a DC bus 405, a voltmeter 406, an ammeter 407, a second DC/AC conversion circuit 408, a fourth control circuit 409, a voltmeter 410, and an ammeter 411.

Voltmeter 401 measures a third DC voltage output from storage battery 3.

Ammeter 402 measures a third DC current output from storage battery 3.

Second DC/DC conversion circuit 403 converts the third DC voltage output from storage battery 3 into a fourth DC voltage.

DC bus 405 supplies the fourth DC voltage to second DC/AC conversion circuit 408.

Voltmeter 406 measures the fourth DC voltage on DC bus 405.

Ammeter 407 measures a fourth DC current in DC bus 405.

Second DC/AC conversion circuit 408 converts the fourth DC voltage (DC power) output from second DC/DC conversion circuit 403 into an AC voltage (AC power), and outputs the AC voltage (AC power) to consumer premises distribution system 10.

Voltmeter 410 measures the AC voltage of consumer premises distribution system 10 as the AC voltage at interconnection point N.

Ammeter 411 measures the AC current flowing through consumer premises distribution system 10.

Third control circuit 404 controls second DC/DC conversion circuit 403 based on, for example, the output from voltmeter 401, the output from ammeter 402, and the output from voltmeter 406.

Fourth control circuit 409 controls second DC/AC conversion circuit 408 based on, for example, the output from voltmeter 406, the output from ammeter 407, the output from voltmeter 410, and the output from ammeter 411.

Figure 4:
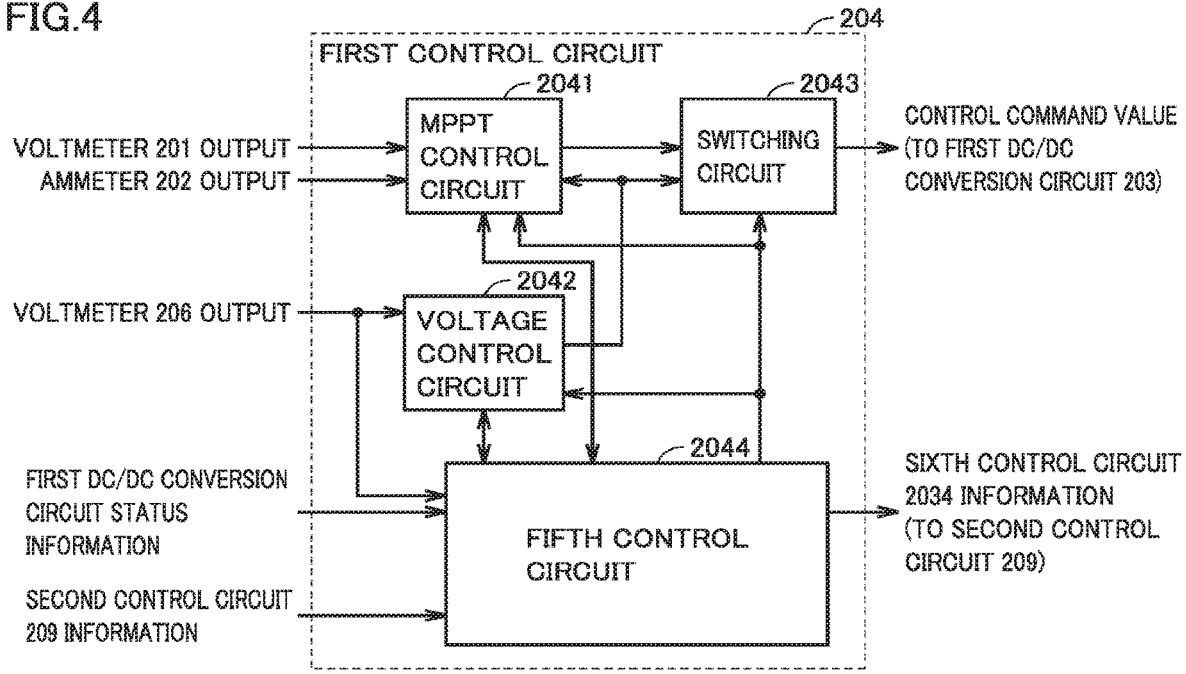
FIG. 4 is a diagram showing a configuration of a first control circuit 204.

FIG. 4 is a diagram showing a configuration of first control circuit 204.

First control circuit 204 includes a maximum power point tracking (MPPT) control circuit 2041, a voltage control circuit 2042, a switching circuit 2043, and a fifth control circuit 2044.

MPPT control circuit 2041 searches for the maximum power point of solar panel 1 and generates the control command value for controlling to take out the power, based on the outputs from voltmeter 201 and ammeter 202, so as to maximally take out the power supplied from solar panel 1.

Voltage control circuit 2042 controls the voltage of solar panel 1 and generates the control command value for controlling the power to be taken out of solar panel 1, based on the output from voltmeter 206.

Switching circuit 2043 switches between the output from MPPT control circuit 2041 and the output from voltage control circuit 2042, as a control command value to be output to first DC/DC conversion circuit 203.

Fifth control circuit 2044 outputs control parameters and control target values to MPPT control circuit 2041 and voltage control circuit 2042, and manages the power generation state of solar panel 1. Fifth control circuit 2044 also outputs a control signal for switching circuit 2043.

Figure 5:
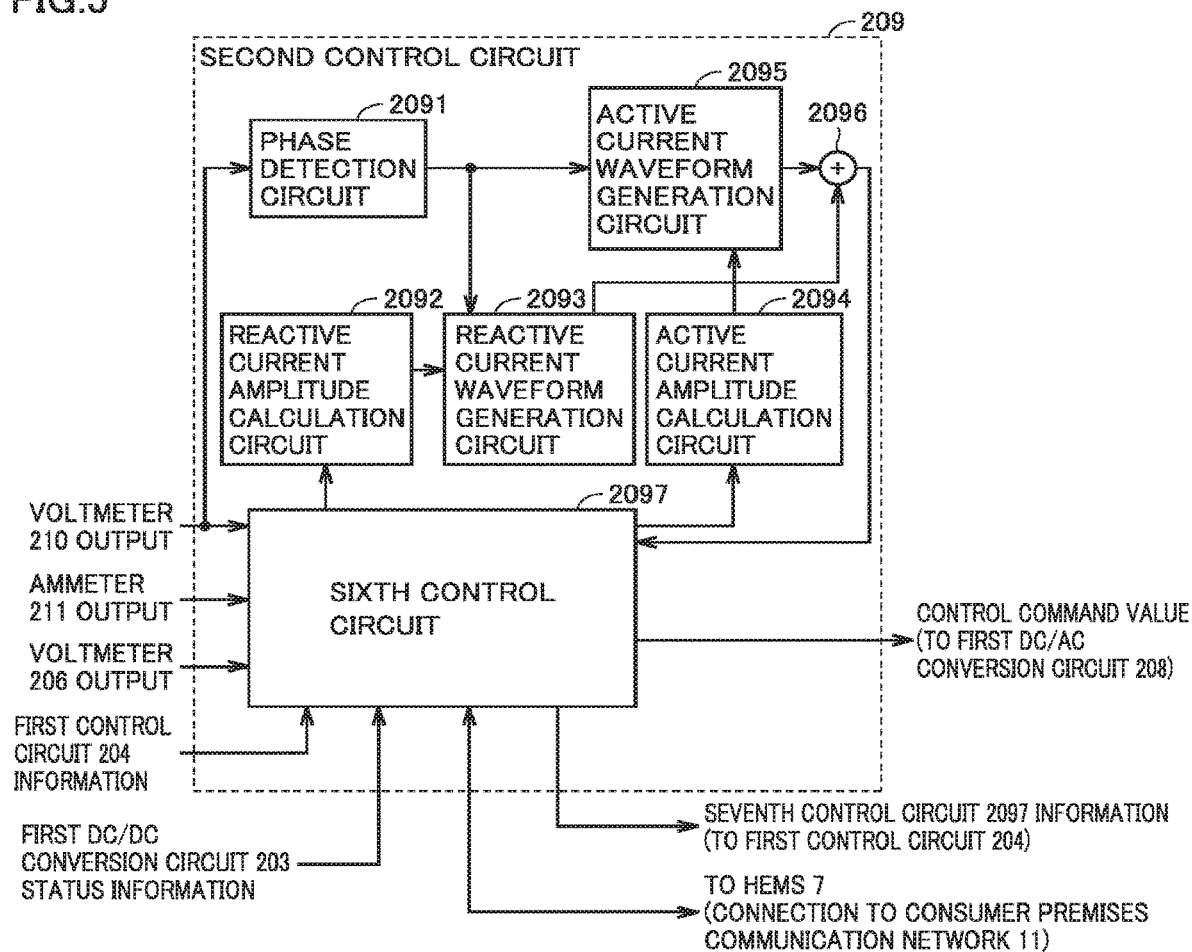
FIG. 5 is a diagram showing a configuration of a second control circuit 209.

FIG. 5 is a diagram showing a configuration of second control circuit 209.

Second control circuit 209 includes a phase detection circuit 2091, a reactive current amplitude calculation circuit 2092, a reactive current waveform generation circuit 2093, an active current amplitude calculation circuit 2094, an active current waveform generation circuit 2095, an adder 2096, and a sixth control circuit 2097.

Phase detection circuit 2091 detects the phase of the voltage waveform of the alternating voltage measured by voltmeter 210, and outputs the phase detection information of the AC voltage.

Reactive current amplitude calculation circuit 2092 calculates the target amplitude of the reactive current output from first DC/AC conversion circuit 208, based on the AC voltage effective value calculated by sixth control circuit 2097.

Reactive current waveform generation circuit 2093 generates the waveform of the reactive current output from first DC/AC conversion circuit 208, based on the phase detection information of the AC voltage output from phase detection circuit 2091, and based on the target amplitude of the reactive current output from reactive current amplitude calculation circuit 2092.

Active current amplitude calculation circuit 2094 calculates the target amplitude of the active current, based on the active current information calculated by sixth control circuit 2097.

Active current waveform generation circuit 2095 generates the waveform of the active current output from first DC/AC conversion circuit 208, based on the phase detection information of the AC voltage output from phase detection circuit 2091, and based on the target amplitude of the active current output from active current amplitude calculation circuit 2094.

Adder 2096 adds the waveform of the reactive current output from reactive current waveform generation circuit 2093 and the waveform of the active current output from active current waveform generation circuit 2095, and generates the target value for the AC current output from first DC/AC conversion circuit 208.

Sixth control circuit 2097 calculates the AC voltage effective value based on the AC voltage measured by voltmeter 210, and outputs the effective value to reactive current amplitude calculation circuit 2092.

Sixth control circuit 2097 calculates the active current information based on the voltage on DC bus 205 measured by voltmeter 206, and outputs the active current information to active current amplitude calculation circuit 2094.

Sixth control circuit 2097 generates the current command value for controlling first DC/AC conversion circuit 208, based on the target value for the AC current output from adder 2096, and based on the AC current measured by ammeter 211.

Figure 6:
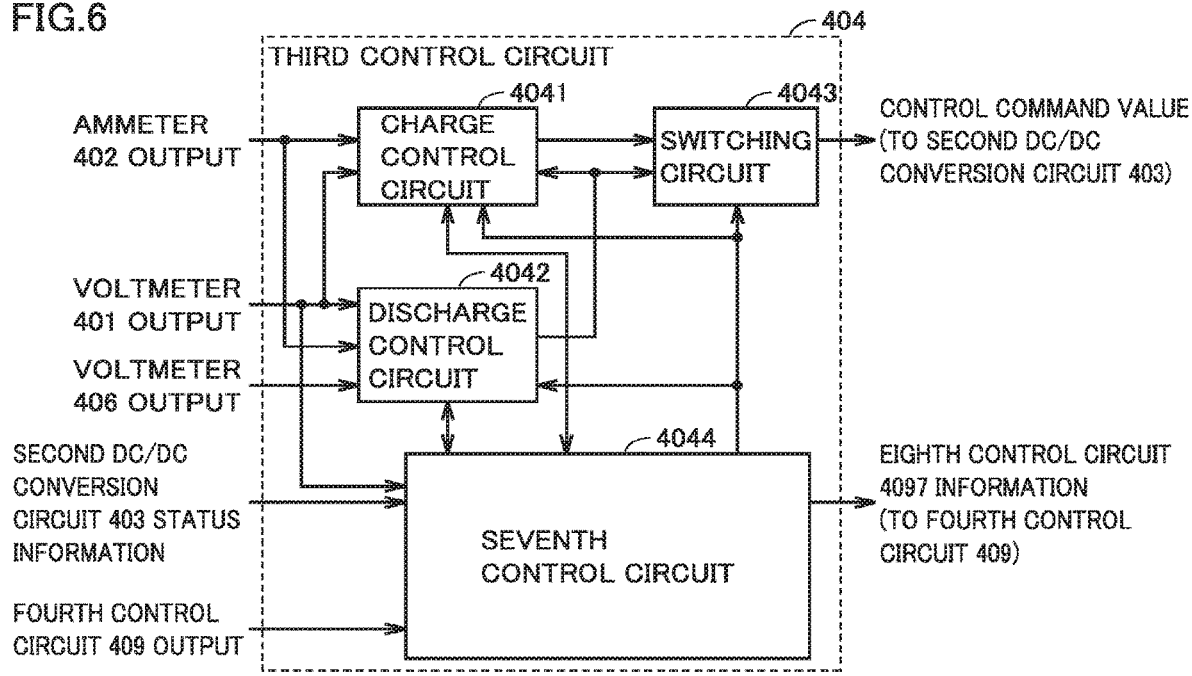
FIG. 6 is a diagram showing a configuration of a third control circuit 404.

FIG. 6 is a diagram showing a configuration of third control circuit 404.

Third control circuit 404 includes a charge control circuit 4041, a discharge control circuit 4042, a switching circuit 4043, and a seventh control circuit 4044.

Charge control circuit 4041 calculates the command value for controlling the charging of storage battery 3, based on the output from ammeter 402 and the output from voltmeter 401.

Discharge control circuit 4042 calculates the command value for controlling the discharging from storage battery 3, based on the output from ammeter 402 and the output from voltmeter 401.

Switching circuit 4043 switches between the output from charge control circuit 4041 and the output from discharge control circuit 4042.

Seventh control circuit 4044 outputs control parameters and control target values to charge control circuit 4041 and discharge control circuit 4042, and manages the charge power amount, the charge current, and the discharge power amount for storage battery 3. Seventh control circuit 4044 also outputs a control signal for switching circuit 4043.

Figure 7:
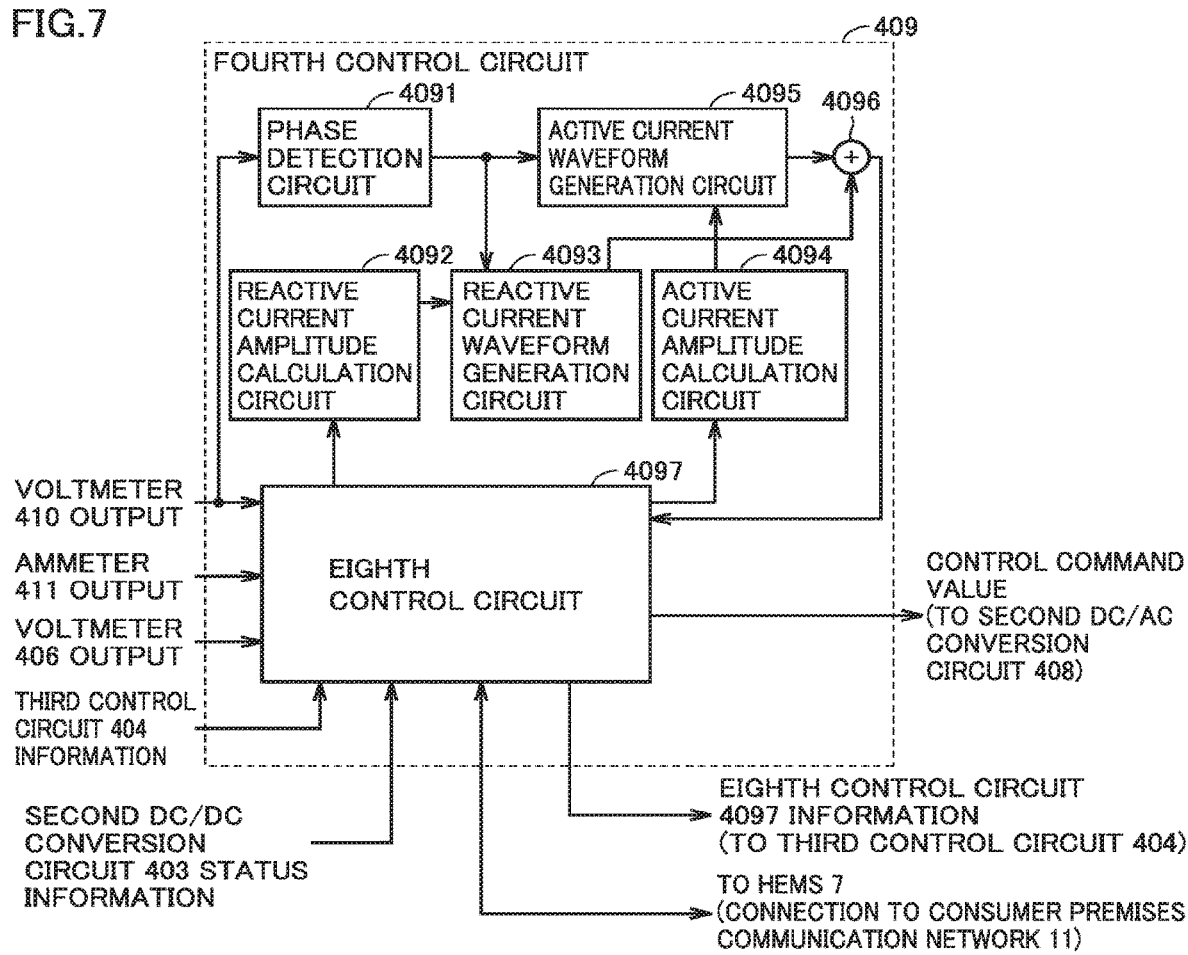
FIG. 7 is a diagram showing a configuration of a fourth control circuit 409.

FIG. 7 is a diagram showing a configuration of fourth control circuit 409.

Fourth control circuit 409 includes a phase detection circuit 4091, a reactive current amplitude calculation circuit 4092, a reactive current waveform generation circuit 4093, an active current amplitude calculation circuit 4094, an active current waveform generation circuit 4095, an adder 4096, and an eighth control circuit 4097.

Phase detection circuit 4091 detects the voltage waveform of the alternating voltage measured by voltmeter 410, and outputs the phase detection information of the AC voltage.

Reactive current amplitude calculation circuit 4092 calculates the target amplitude of the reactive current output from second DC/AC conversion circuit 408, based on the AC voltage effective value calculated by eighth control circuit 4097.

Reactive current waveform generation circuit 4093 generates the waveform of the reactive current output from second DC/AC conversion circuit 408, based on the phase detection information of the AC voltage output from phase detection circuit 4091, and based on the target amplitude of the reactive current output from reactive current amplitude calculation circuit 4092.

Active current amplitude calculation circuit 4094 calculates the target amplitude of the active current, based on the active current information calculated by eighth control circuit 4097.

Active current waveform generation circuit 4095 generates the waveform of the active current output from second DC/AC conversion circuit 408, based on the phase detection information of the AC voltage output from phase detection circuit 4091, and based on the target amplitude of the active current output from active current amplitude calculation circuit 4094.

Adder 4096 adds the waveform of the reactive current output from reactive current waveform generation circuit 4093 and the waveform of the active current output from active current waveform generation circuit 4095, and generates the target value for the AC current output from second DC/AC conversion circuit 408.

Eighth control circuit 4097 calculates the AC voltage effective value based on the AC voltage measured by voltmeter 410, and outputs the effective value to reactive current amplitude calculation circuit 4092.

Eighth control circuit 4097 calculates the active current information based on the voltage on DC bus 405 measured by voltmeter 406, and outputs the active current information to active current amplitude calculation circuit 4094.

Eighth control circuit 4097 generates the current command value for controlling second DC/AC conversion circuit 408, based on the target value for the AC current output from adder 4096, and based on the AC current measured by ammeter 411.

Next, the specific operation of the distributed power supply system in embodiment 1 is described. The following describes the operation of the distributed power supply system with a focus on solar panel 1, solar-panel power conversion device 2, storage battery 3, and storage-battery power conversion device 4.

When HEMS 7 starts up, HEMS 7 checks the statuses of solar-panel power conversion device 2, storage-battery power conversion device 4, and load 5 connected to consumer premises communication network 11. At this time, if HEMS 7 has been notified of the controlling information for solar-panel power conversion device 2 by CEMS 15, HEMS 7 notifies the controlling information to solar-panel power conversion device 2 through consumer premises communication network 11. If HEMS 7 has been notified of the controlling information for storage-battery power conversion device 4 by CEMS 15, HEMS 7 notifies the controlling information to storage-battery power conversion device 4 through consumer premises communication network 11.

Embodiment 1 describes a case in which the Echonet Lite is used as the protocol for consumer premises communication network 11, and the Ethernet (registered trademark) is used as the physical layer. However, the protocol for consumer premises communication network 11 is not limited to the Echonet Lite, but may be another protocol or a proprietary protocol. The physical layer is not limited to the Ethernet, but may be, for example, a wireless network, such as a wireless services module (WISM) or specified low power radio, a power line communication (PLC) network using electric-light wiring, or an optical network.

CEMS 15 and HEMS 7 are connected through outside premises communication network 13. The exchange of information between CEMS 15 and HEMS 7 is described later.

When HEMS 7 finishes checking the statuses of solar-panel power conversion device 2, storage-battery power conversion device 4, and load 5, HEMS 7 monitors the operations of solar-panel power conversion device 2, storage-battery power conversion device 4, and load 5. Specifically, HEMS 7 manages the power consumption of load 5, the power generation from energy creation apparatus 111, and the charge-discharge power for energy storage apparatus 333. If HEMS 7 is notified of the command by CEMS 15, HEMS 7 notifies instructions to solar-panel power conversion device 2, storage-battery power conversion device 4, and load 5, in accordance with the command. HEMS 7 sends to CEMS 15 the amount of power which HEMS 7 manages.

Next, a description is given to the specific principle of operation of the control for restraining the increase in AC voltage of commercial system 17.

When the power generated from solar panel 1 increases and thus the AC voltage effective value of commercial system 17 outside the premises increases, solar-panel power conversion device 2 outputting reactive power can restrain the increase in AC voltage. Accordingly, solar-panel power conversion device 2 monitors the AC voltage effective value at interconnection point N connected to commercial system 17, and, in response to an increase in the AC voltage effective value, outputs reactive power.

Figure 8:
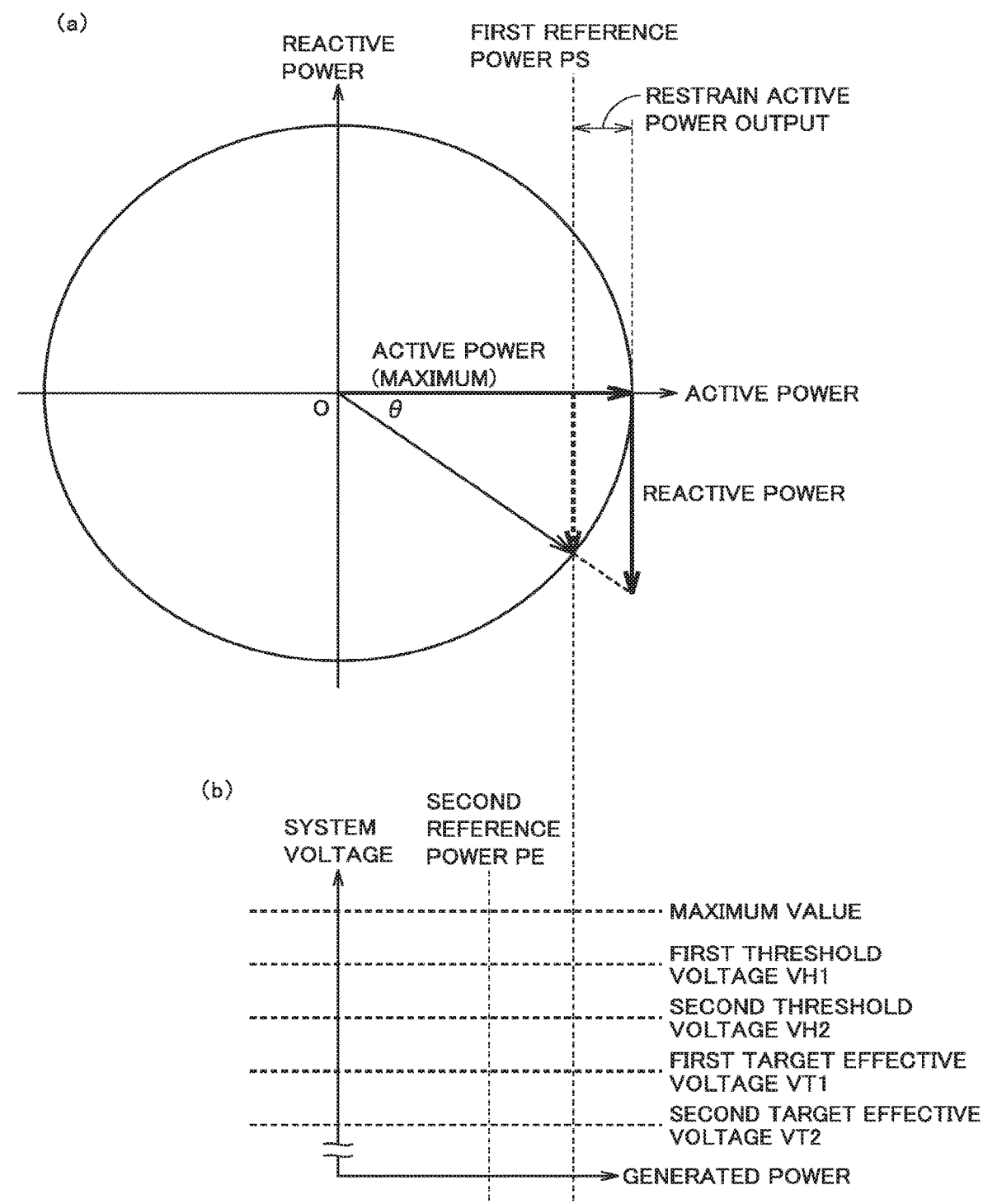
FIG. 8 is a diagram for explaining the concept of a method for controlling the system voltage using reactive power.

FIGS. 8 (*a*) and (*b*) is a diagram for explaining the concept of a method for controlling the system voltage using reactive power.

With reference to FIGS. 8 (*a*) and (*b*), a description is hereinafter given to the specific principle of operation of the control for restraining the increase in AC voltage of commercial system 17 in embodiment 1. When the amount of power generation from a distributed power supply (e.g., solar panel 1) increases and thus the AC voltage effective value of commercial system 17 outside the premises increases, solar-panel power conversion device 2 outputting reactive power can restrain the increase in AC voltage. Accordingly, solar-panel power conversion device 2 may have a function to monitor the AC voltage effective value of consumer premises distribution system 10, and, in response to an increase in the AC voltage effective value, output reactive power.

FIG. 8 (*a*) describes a circle graph having the origin 0 at its center. The circle graph has a horizontal axis representing the active power (or active current), and a vertical axis representing the reactive power (or reactive current). In general, in many cases, the rated power or maximum power that can be output from solar-panel power conversion device 2 connected to solar panel 1 is the same as the maximum power generated from solar panel 1. For example, if 4 kW solar panel 1 is installed, solar-panel power conversion device 2 has a rated power of 4 kW. The circle graph of FIG. 8 (*a*) shows the maximum power that can be output from solar-panel power conversion device 2 (corresponding to the radius of the circle graph). That is, solar-panel power conversion device 2 can supply, to consumer premises distribution system 10, the power that lies inside the circle graph.

The circle graph of FIG. 8 (*a*) is described in more detail. For example, when the reactive power is zero, solar-panel power conversion device 2 can output the maximum power generated from solar panel 1 (see the size of the arrow indicated by "active power (maximum)") as shown in FIG. 8 (*a*). However, if solar-panel power conversion device 2 outputs reactive power for restraining the increase in system voltage while solar panel 1 is generating maximum power, the coordinates of the power obtained by adding the reactive power and the active power will lie outside the circle graph of FIG. 8 (*a*). Solar-panel power conversion device 2 cannot output the power that lies outside the circle graph. Therefore, when solar-panel power conversion device 2 outputs reactive power, the output of active power has to be reduced for adding the reactive power, as shown in FIG. 8 (*a*).

The Grid-interconnection Code specifies that the power factor is equal to or higher than 0.85. In FIG. 8 (*a*), θ represents the angle that satisfies cos θ=0.85. Therefore, solar-panel power conversion device 2 can output a reactive power of up to (the rated power of solar-panel power conversion device 2)×sin θ. This reactive power corresponds to the size of the broken line arrow parallel to the vertical axis in FIG. 8 (*a*).

Accordingly, in embodiment 1, when the output of reactive power is required for restraining the power generated from solar panel 1 (indicated by "active power" in FIG. 8), the reactive power is output from storage-battery power conversion device 4, thereby restraining the increase in AC voltage of commercial system 17 (consumer premises distribution system 10), so that solar-panel power conversion device 2 can maximally output the power generated from solar panel 1.

Specifically, if the present power generated from solar panel 1 is equal to or lower than 85% of the rated power (maximum output power) of solar-panel power conversion device 2, the power generated from solar panel 1 is not restrained even when solar-panel power conversion device 2 outputs reactive power. That is, the output power obtained by adding the reactive power and the active power lies inside the circle graph of FIG. 8 (*a*). In this case, solar-panel power conversion device 2 outputs reactive power so that the AC voltage at interconnection point N will be equal to or lower than a specified voltage.

On the other hand, if the present power generated from solar panel 1 is higher than 85% of the rated power (maximum output power) of solar-panel power conversion device 2, solar-panel power conversion device 2 generating reactive power may cause the coordinates of the power output from solar-panel power conversion device 2 to go out of the circle graph of FIG. 8 (*a*). In this case, solar-panel power conversion device 2 restrains the amount of power generated from solar panel 1 so as to restrain the active power. Accordingly, in embodiment 1, storage-battery power conversion device 4 is started up and controlled to output the reactive power up to the rated power or maximum output power of storage-battery power conversion device 4, thereby restraining the voltage increase in consumer premises distribution system 10.

Next, the reasons for controlling storage-battery power conversion device 4 as described above are explained. For example, when solar panel 1 is generating sufficient power and storage battery 3 is in a full charge state, storage-battery power conversion device 4 may be on standby in a sleep mode so as to reduce its power consumption. The sleep mode is a standby mode in which little standby power is consumed. When storage-battery power conversion device 4 in this state starts up and generates reactive power, storage-battery power conversion device 4 undesirably consumes the standby power. The standby power includes: the power supplied to relay circuits (not shown) for connection between storage battery 3 and storage-battery power conversion device 4 and between consumer premises distribution system 10 and storage-battery power conversion device 4, and the power supplied to third and fourth control circuits 404 and 409 for controlling storage-battery power conversion device 4. The use of storage-battery power conversion device 4, on standby, also causes undesirable power consumption because of the switching losses and conduction losses caused by the operation of second DC/AC conversion circuit 408 for generating reactive power.

Accordingly, when the present power generated from solar panel 1 is equal to or lower than a first reference power PS, first DC/DC conversion circuit 203 in solar-panel power conversion device 2 generates reactive power without using storage-battery power conversion device 4, since the power generated from solar panel 1 can be output to interconnection point N through consumer premises distribution system 10 without being restrained. This can prevent undesirable power consumption for restraining the voltage increase in consumer premises distribution system 10 and the voltage increase at interconnection point N.

On the other hand, when the present power generated from solar panel 1 is higher than first reference power PS, storage-battery power conversion device 4 starts up so that storage-battery power conversion device 4 as well as solar-panel power conversion device 2 can generate reactive power. This can restrain the voltage increase in consumer premises distribution system 10, which in turn prevents unnecessary restraint on the power generated from solar panel 1.

First reference power PS is a numerical value equal to or lower than a value obtained by multiplying the rated power of solar-panel power conversion device 2 by a power factor R, where the Grid-interconnection Code specifies that the power factor is equal to or higher than certain value R. For example, if the power factor specified is equal to or higher than 0.85, first reference power PS is a numerical value equal to or lower than 0.85 times the rated power of solar-panel power conversion device 2. Although embodiment 1 describes a case in which first reference power PS is 0.85 times the rated power of solar-panel power conversion device 2, first reference power PS may be 0.82 times the rated power of solar-panel power conversion device 2, considering the errors of the measuring instruments (e.g., the voltmeter and ammeter), the losses at solar-panel power conversion device 2, and the like.

Further, since the distributed power supplies placed in each consumer premises can restrain the voltage increase in commercial system 17, commercial system 17 does not require an expensive facility for stabilizing the distribution system, such as an SVC or system storage battery. If any, the facility for stabilizing the distribution system can be reduced in capacity and thus allows cost reduction.

In embodiment 1, the AC voltage in the distribution system is detected by consumer premises distribution system 10. However, it should be understood that, instead of this, for example, the AC voltage input to smart meter 8 or the AC voltage just under pole-mount transformer 9 may be used, if measurable.

Solar-panel power conversion device 2 and storage-battery power conversion device 4 independently operate without directly exchanging information through a communication line. In order to achieve such independent operation without mutual exchange of information, HEMS 7 sends the control information to solar-panel power conversion device 2 and storage-battery power conversion device 4.

When the voltage at interconnection point N increases, solar-panel power conversion device 2 can independently generate reactive power to restrain the increase in system voltage with no knowledge of the operation of storage-battery power conversion device 4. Solar-panel power conversion device 2, which does not need to have a special function, can be a commercially available one that has a function of restraining the increase in system voltage using reactive power. By storage-battery power conversion device 4 monitoring the power output from solar-panel power conversion device 2, storage-battery power conversion device 4 can independently determine whether to generate reactive power.

Specifically, HEMS 7 sends solar-panel control information to solar-panel power conversion device 2. The solar-panel control information contains a first target effective voltage VT1 and a first threshold voltage VH1.

First threshold voltage VH1 is an AC effective voltage at the time when solar-panel power conversion device 2 starts outputting reactive power.

First target effective voltage VT1 is the target value for the AC effective voltage at the time when solar-panel power conversion device 2 generates reactive power. First target effective voltage VT1 may also be referred to as a first system voltage target value.

HEMS 7 sends storage-battery control information to storage-battery power conversion device 4. The storage-battery control information contains a first reference power PS, a second reference power PE, a second threshold voltage VH2, and a second target effective voltage VT2.

As described above, first reference power PS is the power generated from solar panel 1, i.e., the active power output from solar-panel power conversion device 2, at the time when storage-battery power conversion device 4 starts generating reactive power to restrain the system voltage.

Second reference power PE is the power generated from solar panel 1, i.e., the active power output from solar-panel power conversion device 2, at the time when storage-battery power conversion device 4 finishes generating reactive power.

Second threshold voltage VH2 is the AC effective voltage at the time when storage-battery power conversion device 4 starts outputting reactive power. Second threshold voltage VH2 may also be referred to as a first system voltage threshold voltage.

Second target effective voltage VT2 is the target value for the AC effective voltage at the time when storage-battery power conversion device 4 generates reactive power. Second target effective voltage VT2 may also be referred to as a second system voltage target value.

In embodiment 1, when the power generated from solar panel 1 and output from solar-panel power conversion device 2 is higher than first reference power PS, the relation of (first reference power PS)>(second reference power PE), and the relation of (first threshold voltage VH1)>(second threshold voltage VH2)>(first target effective voltage VT1)>(second target effective voltage VT2) are satisfied, as shown in FIG. 8 (*b*). The relation between first target effective voltage VT1 and second target effective voltage VT2 is not limited to the above.

By setting second threshold voltage VH2 to lower than first threshold voltage VH1, storage-battery power conversion device 4 preferentially outputs reactive power when the present power generated from solar panel 1 is higher than first reference power PS. That is, storage-battery power conversion device 4 outputs reactive power when the AC effective voltage at interconnection point N increases to above second threshold voltage VH2, but solar-panel power conversion device 2 does not output reactive power until the AC effective voltage at interconnection point N increases to first threshold voltage VH1.

Also, by setting second target effective voltage VT2 to lower than first target effective voltage VT1, when the present power generated from solar panel 1 is higher than first reference power PS, the reactive power output from solar-panel power conversion device 2 is restrained so that storage-battery power conversion device 4 preferentially outputs reactive power. If the reactive power preferentially output from storage-battery power conversion device 4 alone is not enough to restrain the AC effective voltage at interconnection point N, solar-panel power conversion device 2 also generates reactive power. In this way, the voltage at interconnection point N can be stabilized without the unnecessary restraint on the power generated from solar panel 1.

Figure 9:
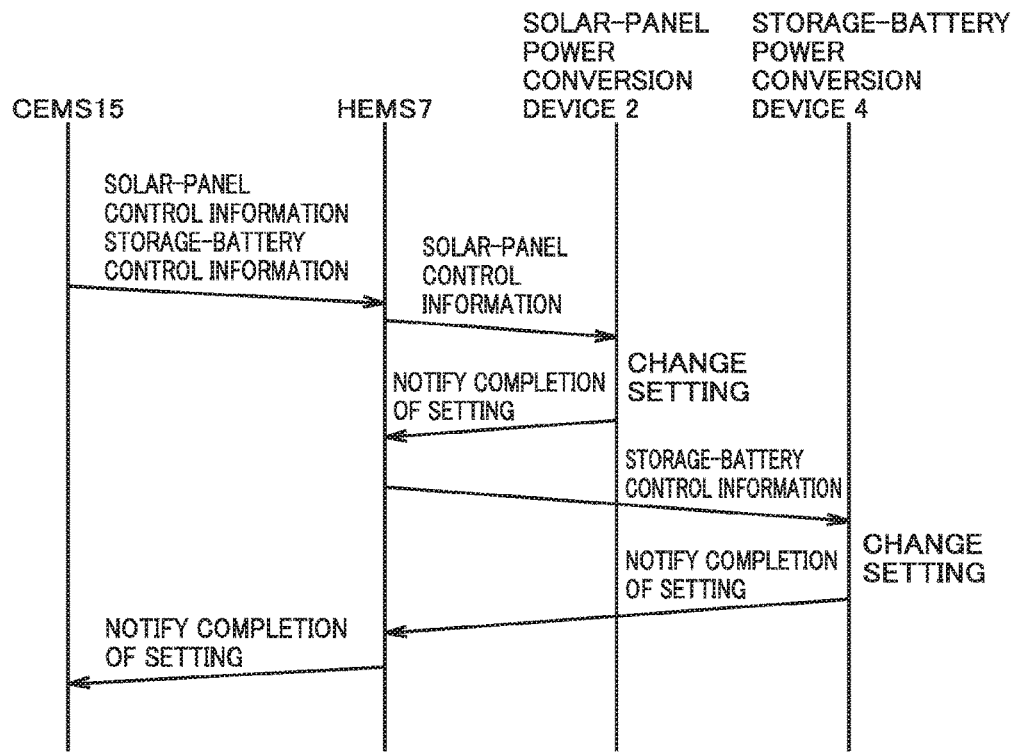
FIG. 9 is a sequence diagram showing a procedure for transferring the solar-panel control information and the storage-battery control information to consumer equipment 18.

FIG. 9 is a sequence diagram showing a procedure for transferring the solar-panel control information and the storage-battery control information to consumer equipment 18.

With reference to FIG. 9, CEMS 15 manages the demand and supply situations of surrounding buildings, condominiums, factories, hospitals etc., as well as smart towns, and constructs a database for stabilizing the system voltage. CEMS 15 predicts the power consumption of each consumer and the power generation from solar panel 1, based on the predicted results of the insolation amount, the wind velocity, and the ambient temperature etc. CEMS 15 generates and notifies the control information optimum for each consumer based on the predicted results. Specifically, when any change is made to the solar-panel control information and storage-battery control information, CEMS 15 sends the new solar-panel control information and storage-battery control information to HEMS 7 of each consumer equipment 18.

HEMS 7 notifies solar-panel power conversion device 2 of the new solar-panel control information.

When solar-panel power conversion device 2 receives the new solar-panel control information, solar-panel power conversion device 2 writes the numerical value in a register (not shown) in sixth control circuit 2097 in second control circuit 209. Upon completing writing the numerical value, solar-panel power conversion device 2 notifies HEMS 7 to that effect. At this time, solar-panel power conversion device 2 also notifies the received solar-panel control information. When HEMS 7 receives this notification, HEMS 7 checks the received solar-panel control information and checks whether or not the solar-panel control information has been normally sent. If the solar-panel control information has not been normally sent, HEMS 7 resends it.

On the other hand, if it has been normally sent, HEMS 7 sends the new storage-battery control information to storage-battery power conversion device 4.

When storage-battery power conversion device 4 receives the new storage-battery control information, storage-battery power conversion device 4 writes the numerical value in a register (not shown) in eighth control circuit 4097 in fourth control circuit 409. Upon completing writing the numerical value, storage-battery power conversion device 4 notifies HEMS 7 to that effect. At this time, storage-battery power conversion device 4 also notifies the received storage-battery control information. When HEMS 7 receives this notification, HEMS 7 checks the received storage-battery control information and checks whether or not the storage-battery control information has been normally sent. If the storage-battery control information has not been normally sent, HEMS 7 resends it.

After that, HEMS 7 notifies CEMS 15 that a change in setting has completed, along with the received solar-panel control information and storage-battery control information. CEMS 15 checks the notified solar-panel control information and storage-battery control information, and checks whether or not the solar-panel control information and the storage-battery control information have been normally sent. If the solar-panel control information and the storage-battery control information have not been normally sent, CEMS 15 resends them. If they have been normally sent, the process ends.

Figure 10:
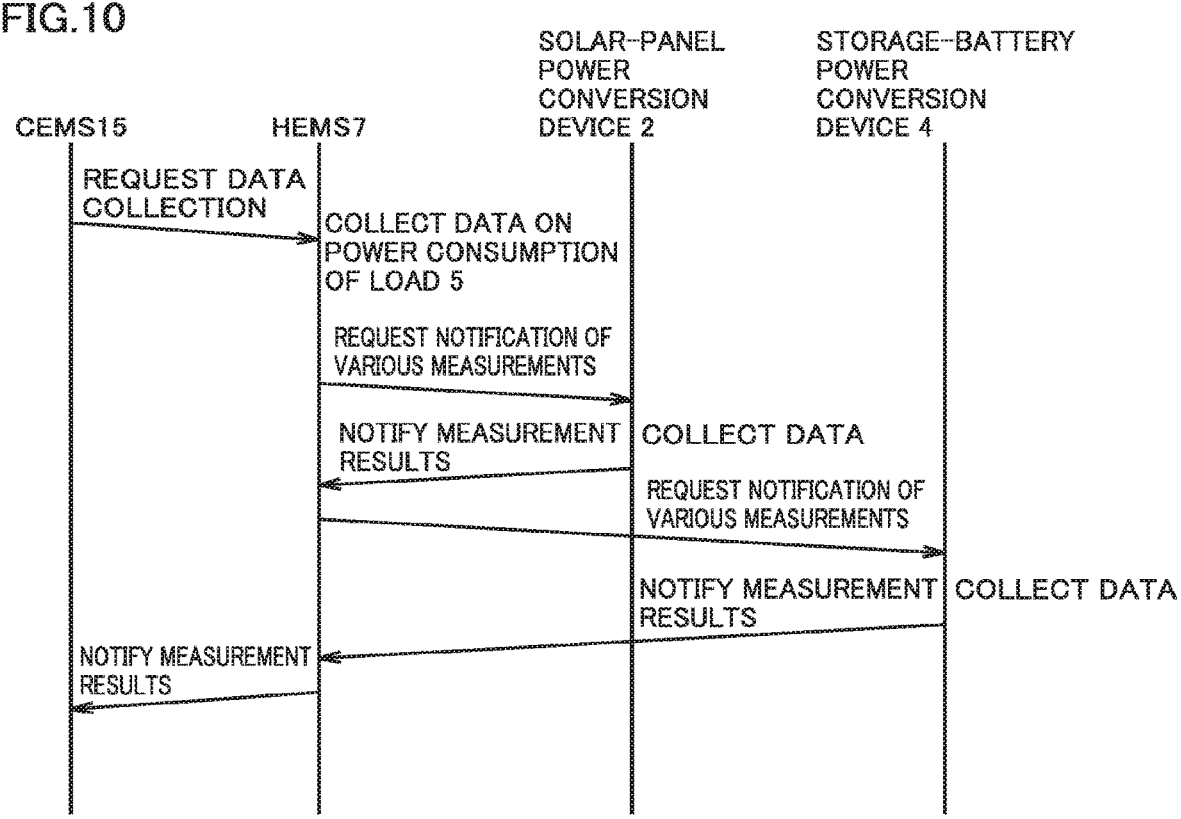
FIG. 10 is a sequence diagram showing a procedure for transferring the measurement data collected at solar-panel power conversion device 2 and storage-battery power conversion device 4 to a CEMS 15.

FIG. 10 is a sequence diagram showing a procedure for transferring the measurement data collected at solar-panel power conversion device 2 and storage-battery power conversion device 4 to CEMS 15. Although not shown, HEMS 7 collects and manages, through signal line 12, the power of each breaker including the power consumption of load 5 measured by power measurement circuit 61 in distribution switchboard 6.

CEMS 15 sends a data collection request to HEMS 7 of each consumer equipment 18.

When HEMS 7 receives the data collection request, HEMS 7 checks the amount of power consumption per unit time of load 5 in consumer equipment 18 stored in a memory (not shown) in HEMS 7, based on the power measurement result measured by power measurement circuit 61. Upon completing the check, HEMS 7 sends a request notification to solar-panel power conversion device 2 to request for notification of various measurement results.

When solar-panel power conversion device 2 receives the request notification from HEMS 7, solar-panel power conversion device 2 reads measurement results from a memory (not shown) in sixth control circuit 2097 and notifies HEMS 7 of the measurement results. The measurement results are composed of the power generated from solar panel 1 per unit time, the active power and reactive power output per unit time, and the restraint on power generation per unit time.

When HEMS 7 receives the notification of measurement results from solar-panel power conversion device 2, HEMS 7 checks their contents and then sends a request notification to storage-battery power conversion device 4 to request for notification of various measurement results.

When storage-battery power conversion device 4 receives the request notification from HEMS 7, storage-battery power conversion device 4 reads measurement results from a memory (not shown) in eighth control circuit 4097 and notifies HEMS 7 of the measurement results. The measurement results are composed of the amount of charge-discharge power of storage battery 3 per unit time, and the active power and reactive power output per unit time.

When HEMS 7 receives the notification of measurement results from storage-battery power conversion device 4, HEMS 7 checks their contents and then sends to CEMS 15 various measurement results including the amount of power consumption of load 5.

When CEMS 15 receives the various measurement results, CEMS 15 associates the measurement results on solar-panel power conversion device 2 with the solar-panel control information notified to solar-panel power conversion device 2, and associates the measurement results on storage-battery power conversion device 4 with the storage-battery control information notified to storage-battery power conversion device 4. Then, CEMS 15 stores them in a system voltage stabilization database (not shown).

At this time, CEMS 15 also associates the information on a month, a day of the week, an actual insolation amount, an actual wind velocity, and an actual ambient temperature as well as the time information, and stores them in the system voltage stabilization database. The solar-panel control information and the storage-battery control information notified to solar-panel power conversion device 2 and storage-battery power conversion device 4 differ depending on consumer equipment 18. When CEMS 15 detects or predicts an increase in system voltage based on the measurement results of the system voltage at each measurement point installed for commercial system 17, CEMS 15 calculates and notifies the solar-panel control information and the storage-battery control information for each consumer equipment 18 on a real-time basis. The measurement points may be, for example, pole-mount transformers 9-1 to 9-$m$.

CEMS 15 also constructs a power consumption database (not shown) for the information on the power consumption of each consumer equipment 18. At this time, the power consumption data is associated with a month, a day of the week, an actual weather and an actual ambient temperature, as well as time information, and is stored in the power consumption database.

The reasons why CEMS 15 constructs such a databased are explained. In the smart community managed by CEMS 15, there are various configurations of distribution systems and various placements of distributed power supplies and loads. Also, the amount of increase in system voltage differs depending on the measurement points installed for commercial system 17. Accordingly, CEMS 15 uses the weather forecast information including ambient temperature forecasts, the system voltage stabilization database, and the power consumption database, thereby predicting the power generation from solar panel 1 and the power consumption of load 5 at and after the present time. Then, CEMS 15 predicts the future increase in system voltage, based on the measurement results of the system voltage at each measurement point at present, the predicted results on power generation, and the predicted results on power consumption.

The various measurement results stored in the system voltage stabilization database and the power consumption database can be learned using, for example, deep learning, and the increase in distribution system voltage can be predicted based on the learning results.

When CEMS 15 predicts an increase in distribution system voltage, CEMS 15 generates the solar-panel control information and the storage-battery control information for consumer equipment 18 by, for example, deep learning, based on the various measurement results stored in the system voltage stabilization database and the power consumption database, in the same manner as when an increase in system voltage is predicted.

As to a specific method for learning used by CEMS 15, embodiment 1 may employ any of known methods, such as machine learning and deep learning.

As described above, the solar-panel control information and the storage-battery control information for each consumer equipment 18 are generated based on the results of learning of various measurement results. Thus, the distribution system voltages, which vary in the community, can be effectively and optimally managed.

Storage-battery power conversion device 4 (controller) may be configured to capture, from HEMS 7 (communication interface), the condition for determining second threshold voltage VH2 (first system voltage threshold voltage) and second target effective voltage VT2 (second system voltage target value).

Storage-battery power conversion device 4 (controller) may include a conversion-device-capacity capturing circuitry to capture the conversion device capacity of energy creation apparatus 111 connected to the distribution system. Storage-battery power conversion device 4 may perform control to generate second threshold voltage VH2 (first system voltage threshold voltage) and second target effective voltage VT2 (second system voltage target value), based on the captured output from the conversion-device-capacity capturing circuitry and first target effective voltage VT1 (first system voltage target value).

Referring back to FIG. 3, upon completing checking the notification of the controlling information from HEMS 7, first control circuit 204 checks whether or not solar panel 1 can generate power. Specifically, first control circuit 204 checks whether or not the voltage of solar panel 1 output from voltmeter 201 is higher than a specified value X. If the voltage of solar panel 1 is higher than specified value X, first control circuit 204 notifies to second control circuit 209 that solar panel 1 can generate power.

When second control circuit 209 receives this notification, second control circuit 209 checks the AC voltage of consumer premises distribution system 10 measured by voltmeter 210, so as to check whether or not AC power is being supplied to distribution system 14 under pole-mount transformer 9. As a result of the check of the output from voltmeter 210, if second control circuit 209 determines that an AC voltage having an amplitude of equal to or larger than a specified amount Y is being supplied and that no power failure is occurring in commercial system 17, then second control circuit 209 starts up first DC/AC conversion circuit 208 and issues the instruction to first control circuit 204 to instruct the start of power generation from solar panel 1 (hereinafter referred to as a power generation start instruction).

When fifth control circuit 2044 in first control circuit 204 is notified of the power generation start instruction for solar panel 1 by second control circuit 209, fifth control circuit 2044 issues the instruction to MPPT control circuit 2041 to instruct the start of the control for the maximum power point tracking for solar panel 1. Hereinafter a method for controlling the maximum power point tracking is briefly described.

MPPT control circuit 2041 manages the magnitude relation between the last command value and the command value before last. MPPT control circuit 2041 compares the solar panel 1 power generation measured this time with the solar panel 1 power generation measured last time. If the power generation has been increased this time, MPPT control circuit 2041 changes the command value in the same direction as that of last time. Specifically, if the solar panel 1 power generation has been increased this time as a result of the power generation measurement, MPPT control circuit 2041 performs control as follows: if the last command value was increased from the command value before last, MPPT control circuit 2041 will increase a command value this time; whereas, if the last command value was decreased from the command value before last, MPPT control circuit 2041 will decrease a command value this time.

On the other hand, if MPPT control circuit 2041 determines, as a result of the comparison, that the solar panel 1 power generation measured this time has been decreased from the solar panel 1 power generation measured last time, MPPT control circuit 2041 changes the command value in the direction opposite to that of last time. Specifically, if the solar panel 1 power generation has been decreased this time as a result of the power generation measurement, MPPT control circuit 2041 performs control as follows: if the last command value was increased from the command value before last, MPPT control circuit 2041 will decrease a command value this time; whereas, if the last command value was decreased from the command value before last, MPPT control circuit 2041 will increase a command value this time.

With such control, solar panel 1 is controlled to output maximum power.

Based on the command value output from first control circuit 204, first DC/DC conversion circuit 203 controls a built-in boosting circuit, converts the first DC voltage output from solar panel 1 into the second DC voltage, and outputs the second DC voltage.

When the power supply from solar panel 1 through first DC/DC conversion circuit 203 starts, second control circuit 209 controls first DC/AC conversion circuit 208 to output the power generated from solar panel 1 to consumer premises distribution system 10. Specifically, second control circuit 209 monitors the DC voltage on DC bus 205, and outputs power in synchronization with the waveform of the AC voltage supplied from consumer premises distribution system 10 if the DC voltage is higher than the control target value.

Next, with reference to FIG. 5, the operation of second control circuit 209 is described.

Phase detection circuit 2091 detects the zero cross points on the waveform of the AC voltage of consumer premises distribution system 10 measured by voltmeter 210. Phase detection circuit 2091 outputs the result of detection of the zero cross points to reactive current waveform generation circuit 2093 and active current waveform generation circuit 2095.

Sixth control circuit 2097 measures the AC voltage output from voltmeter 210 and checks whether or not a power failure is occurring in commercial system 17. If a power failure is not occurring in commercial system 17, sixth control circuit 2097 outputs, to active current amplitude calculation circuit 2094, the information on the voltage difference between the DC voltage on DC bus 205 output from voltmeter 206 and the control target for DC bus 205. Sixth control circuit 2097 calculates the AC effective voltage based on the AC voltage of consumer premises distribution system 10 output from voltmeter 210, and outputs the AC effective voltage to reactive current amplitude calculation circuit 2092.

When receiving the AC effective voltage, reactive current amplitude calculation circuit 2092 compares the AC effective voltage with first threshold voltage VH1 shown in FIG. 8 (b). If determining that the AC effective voltage is equal to or lower than first threshold voltage VH1 as a result of the comparison, reactive current amplitude calculation circuit 2092 outputs the result to reactive current waveform generation circuit 2093 so that the amplitude of the reactive current output from first DC/AC conversion circuit 208 will be zero. If the AC effective voltage is higher than first threshold voltage VH1, reactive current amplitude calculation circuit 2092 calculates the target amplitude of the reactive current based on the difference between the AC effective voltage and first target effective voltage VT1, and outputs the calculation result to reactive current waveform generation circuit 2093.

When active current amplitude calculation circuit 2094 receives input of the above-described information on the voltage difference from sixth control circuit 2097, active current amplitude calculation circuit 2094 calculates the target amplitude of the active current and outputs the calculation result to active current waveform generation circuit 2095.

Figure 11:
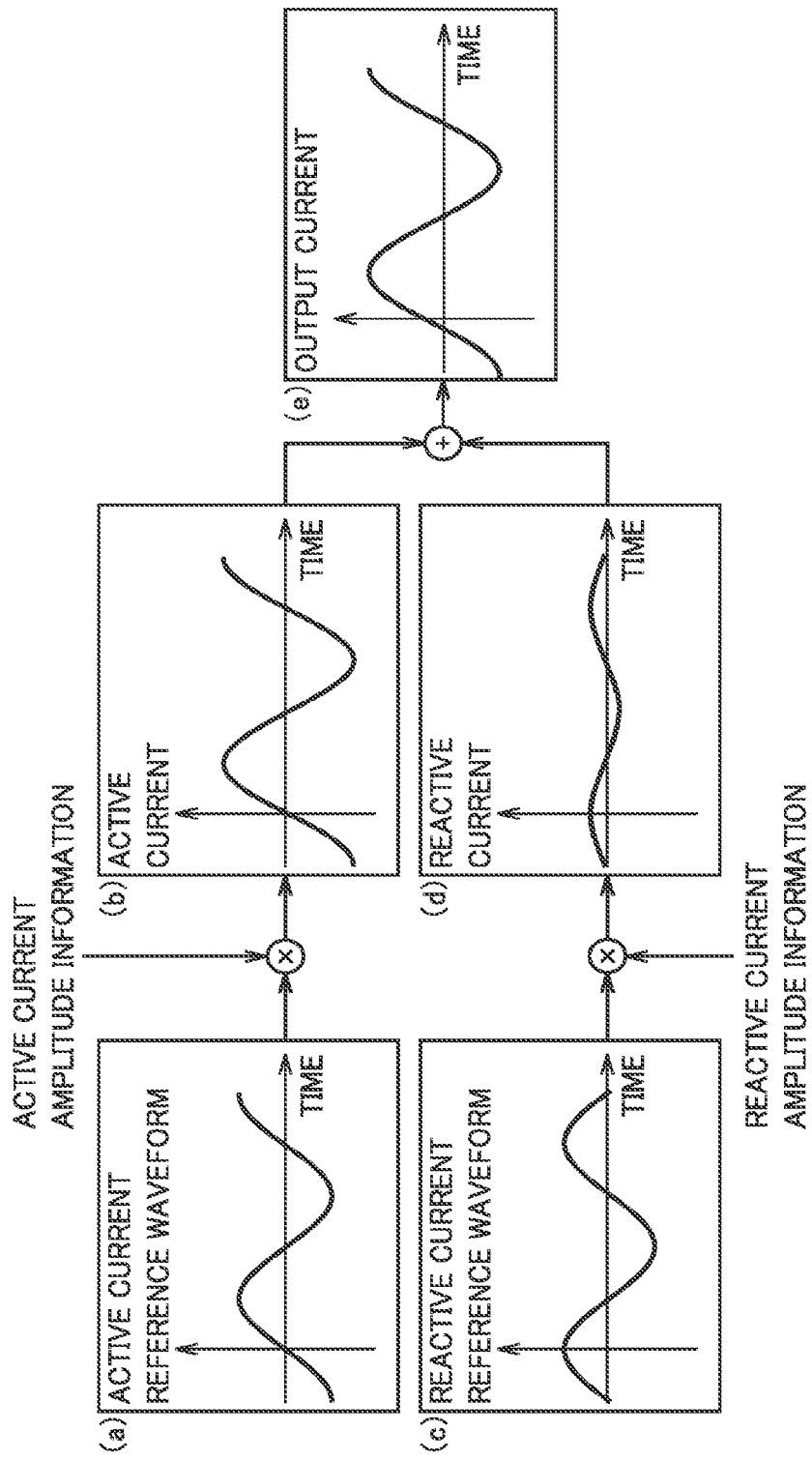
FIG. 11 is a diagram for explaining a method for generating a target value for an AC current including an active current and a reactive current.

FIG. 11 is a diagram for explaining a method for generating a target value for an AC current including an active current and a reactive current.

With reference to FIG. 11, a method is described for generating a target value for an AC current including an active current and a reactive current input to second control circuit 209 and fourth control circuit 409.

Active current waveform generation circuit 2095 or 4095 generates, as an active current reference waveform, a sine wave in phase with the AC voltage of consumer premises distribution system 10 as shown in FIG. 11 (a), based on the information on the zero cross points detected by phase detection circuit 2091 or 4091. Active current waveform generation circuit 2095 or 4095 generates the target value for the active current as shown in FIG. 11 (b) by multiplying the information on the amplitude of the active current output from active current amplitude calculation circuit 2094 or 4094 by the active current reference waveform.

Reactive current waveform generation circuit 2093 or 4093 generates, as a reactive current reference waveform, a cosine wave that is $\pi/2$ ahead in phase relative to the AC voltage of consumer premises distribution system 10 as shown in FIG. 11 (c), based on the information on the zero cross points. Reactive current waveform generation circuit 2093 or 4093 generates the target value for the reactive current as shown in FIG. 11 (d) by multiplying the information on the amplitude of the reactive current output from reactive current amplitude calculation circuit 2092 or 4092 by the reactive current reference waveform.

Adder 2096 or 4096 generates the target value for the AC current as shown in FIG. 11 (e) by adding the target value for the active current output from active current waveform generation circuit 2095 or 4095 and the target value for the reactive current output from reactive current waveform generation circuit 2093 or 4093.

When sixth control circuit 2097 receives input of the target value for the AC current from adder 2096, sixth control circuit 2097 outputs a control command value to first DC/AC conversion circuit 208, based on the output from ammeter 211 obtained by measuring the current flowing through consumer premises distribution system 10, and based on the target value for the AC current. Sixth control circuit 2097 also stores the status information of first DC/DC conversion circuit 203 in a memory (not shown) for management. In embodiment 1, the status information includes the output restraint information of solar panel 1, the information on the amplitude of the active current, and the information on the amplitude of the reactive current sent from first DC/DC conversion circuit 203. Sixth control circuit 2097 reads the status information from the memory, processes the information, and notifies HEMS 7 of the information, based on a notification request from HEMS 7.

Next, with reference to FIG. 6, the operation of third control circuit 404 is described. The charging and discharging of storage battery 3 is controlled by third control circuit 404 in accordance with the charge-discharge instruction of storage battery 3 output from HEMS 7.

HEMS 7 notifies storage-battery power conversion device 4 of the charge-discharge instruction through consumer premises communication network 11.

When eighth control circuit 4097 in fourth control circuit 409 receives the charge-discharge instruction from HEMS 7, eighth control circuit 4097 issues the instruction to seventh control circuit 4044 in third control circuit 404 to request for the status information, such as whether to permit charging and discharging of storage battery 3 and the amount of stored power. At this time, eighth control circuit 4097 also notifies the charge-discharge instruction received from HEMS 7.

When receiving this instruction, seventh control circuit 4044 reads the amount of stored power from a memory (not shown) and determines whether to permit charging and discharging. At this time, seventh control circuit 4044 also checks the ambient temperature output from a thermometer (not shown) to determine whether to permit charging and discharging. Specifically, in embodiment 1, seventh control circuit 4044 determines as follows: if the amount of stored power is higher than 90%, charging is not permitted and discharging is permitted; if ambient temperature is above 35° C. or below 0° C., neither charging nor discharging is permitted so as to prevent deterioration of storage battery 3; and if the charge power amount is zero, charging is permitted and discharging is not permitted. The threshold values for the determination are not limited to the above. The amount of stored power that determines whether to permit charging may be a value higher or lower than 90%. Also, the ambient temperatures that determine whether to permit charging and discharging are not limited to the above numerical values. The properties of storage battery 3, such as temperatures at which storage battery 3 rapidly deteriorates, may be used as the threshold values. Further, when a reactive current is supplied to consumer premises distribution system 10 without performing charging and discharging of storage battery 3, storage-battery power conversion device 4 is started up as exceptional measures.

The status information of storage battery 3, such as the determination result of whether to permit charging and discharging and the amount of stored power, is notified by seventh control circuit 4044 to eighth control circuit 4097. When receiving this status information, eighth control circuit 4097 notifies HEMS 7 of the information through consumer premises communication network 11. If determining that charging and discharging are permitted or that a reactive current is generated, seventh control circuit 4044 switches storage-battery power conversion device 4 from the sleep mode to the charge-discharge mode, upon completing notifying eighth control circuit 4097 of the status information. On the other hand, if determining that neither charging nor discharging is permitted, seventh control circuit 4044 continues the sleep mode.

When seventh control circuit 4044 determines that the mode has switched to the charge-discharge mode, and the charge-discharge instruction is a discharge instruction, then seventh control circuit 4044 outputs, to discharge control circuit 4042, the discharge start instruction and the instruction value for the discharge power amount. The instruction value for the discharge power amount is notified by HEMS 7 along with a charge-discharge command. At this time, seventh control circuit 4044 also outputs the instruction to switching circuit 4043 to select the control command value from discharge control circuit 4042.

When discharge control circuit 4042 receives input of the discharge start instruction, discharge control circuit 4042 calculates the discharge power from storage battery 3 based on the voltage information and the current information input from voltmeter 401 and ammeter 402. Discharge control circuit 4042 generates the control command value so that the calculation result will match the instruction value for the discharge power amount. Discharge control circuit 4042 then outputs the control command value to switching circuit 4043.

Switching circuit 4043 outputs, to second DC/DC conversion circuit 403, the control command value output from discharge control circuit 4042. When receiving the control command value, second DC/DC conversion circuit 403 converts the DC voltage output from storage battery 3 into a DC voltage on DC bus 405, thereby causing storage battery 3 to be discharged, based on the command value. At this time, discharge control circuit 4042 collects the status information (specifically, the discharge power amount) of second DC/DC conversion circuit 403, and notifies eighth control circuit 4097 of the collected information via seventh control circuit 4044. The DC power output from second DC/DC conversion circuit 403 is converted into AC power by second DC/AC conversion circuit 408 to be supplied to consumer premises distribution system 10.

When notified of the charge instruction by HEMS 7, fourth control circuit 409 notifies third control circuit 404 of the charge instruction and the charge power amount or charge current.

When notified of the charge instruction from fourth control circuit 409, seventh control circuit 4044 in third control circuit 404 outputs, to charge control circuit 4041, the charge start instruction and the charge power amount. At this time, seventh control circuit 4044 also outputs the instruction to switching circuit 4043 to select the control command value from charge control circuit 4041.

When receiving input of the charge start instruction, charge control circuit 4041 generates the control command value so that the charge power or charge current to storage battery 3 matches the notified charge power amount or charge current value, based on the current information input from ammeter 402 and the storage battery voltage output from voltmeter 401. Charge control circuit 4041 then outputs the control command value to switching circuit 4043.

Switching circuit 4043 outputs, to second DC/DC conversion circuit 403, the control command value output from charge control circuit 4041. Second DC/DC conversion circuit 403 converts the DC voltage output from storage battery 3 into a DC voltage on DC bus 405, thereby causing storage battery 3 to be charged, based on the received control command value. At this time, charge control circuit 4041 collects the status information (specifically, the charge power amount) of second DC/DC conversion circuit 403, and notifies eighth control circuit 4097 of the collected information via seventh control circuit 4044. In embodiment 1, when only a reactive current is to be output, a discharge mode in which the discharge power is "0" is started.

Next, with reference to FIG. 7, the operation of fourth control circuit 409 is described.

Phase detection circuit 4091 detects the zero cross points on the waveform of the AC voltage of consumer premises distribution system 10 measured by voltmeter 410. Phase detection circuit 4091 outputs the result of detection of the zero cross points to reactive current waveform generation circuit 4093 and active current waveform generation circuit 4095.

Eighth control circuit 4097 measures the AC voltage output from voltmeter 410 and checks whether or not a power failure is occurring in commercial system 17. If a power failure is not occurring, eighth control circuit 4097 outputs, to active current amplitude calculation circuit 4094, the information on the voltage difference between the DC voltage on DC bus 405 output from voltmeter 406 and the control target for DC bus 405. Eighth control circuit 4097 calculates the AC effective voltage based on the AC voltage of consumer premises distribution system 10 output from voltmeter 410, and outputs the AC effective voltage to reactive current amplitude calculation circuit 4092.

When receiving the AC effective voltage, reactive current amplitude calculation circuit 4092 compares the AC effective voltage with second threshold voltage VH2 shown in FIG. 8 (*b*). If determining that the AC effective voltage is equal to or lower than second threshold voltage VH2 as a result of the comparison, reactive current amplitude calculation circuit 4092 sets the target amplitude of the reactive current output from second DC/AC conversion circuit 408 to zero, and outputs the target amplitude to reactive current waveform generation circuit 4093. If the AC effective voltage is higher than second threshold voltage VH2, reactive current amplitude calculation circuit 4092 calculates the target amplitude of the reactive current based on the difference between the AC effective voltage and second target effective voltage VT2, and outputs the calculation result to reactive current waveform generation circuit 4093.

When active current amplitude calculation circuit 4094 receives input of the above-described information on the voltage difference from eighth control circuit 4097, active current amplitude calculation circuit 4094 calculates the target amplitude of the active current and outputs the calculation result to active current waveform generation circuit 4095.

When eighth control circuit 4097 receives input of the target value for the AC current from adder 4096, eighth control circuit 4097 outputs a control command value to second DC/AC conversion circuit 408, based on the output from ammeter 411 obtained by measuring the current flowing through consumer premises distribution system 10, and based on the target value for the AC current. Eighth control circuit 4097 also stores the status information of second DC/DC conversion circuit 403 in a memory (not shown) for management. The status information includes the information on the charge-discharge power of storage battery 3, the information on the amplitude of the active current, and the information on the amplitude of the reactive current sent from second DC/DC conversion circuit 403. Eighth control circuit 4097 reads the status information from the memory, processes the information, and notifies HEMS 7 of the information, based on a notification request from HEMS 7.

Next, the operations of solar-panel power conversion device 2 and storage-battery power conversion device 4 are described in more detail. In embodiment 1, solar-panel power conversion device 2 and storage-battery power conversion device 4 operate independently of each other as described above. In other words, solar-panel power conversion device 2 and storage-battery power conversion device 4 operate without providing information on their internal statuses to each other on a real-time basis. Storage-battery power conversion device 4 uses the measurement results of the solar panel 1 power generation output from power measurement circuit 61 in distribution switchboard 6. That is, storage-battery power conversion device 4 obtains the power generated from solar panel 1 not from solar-panel power conversion device 2 via communication.

Figure 12:
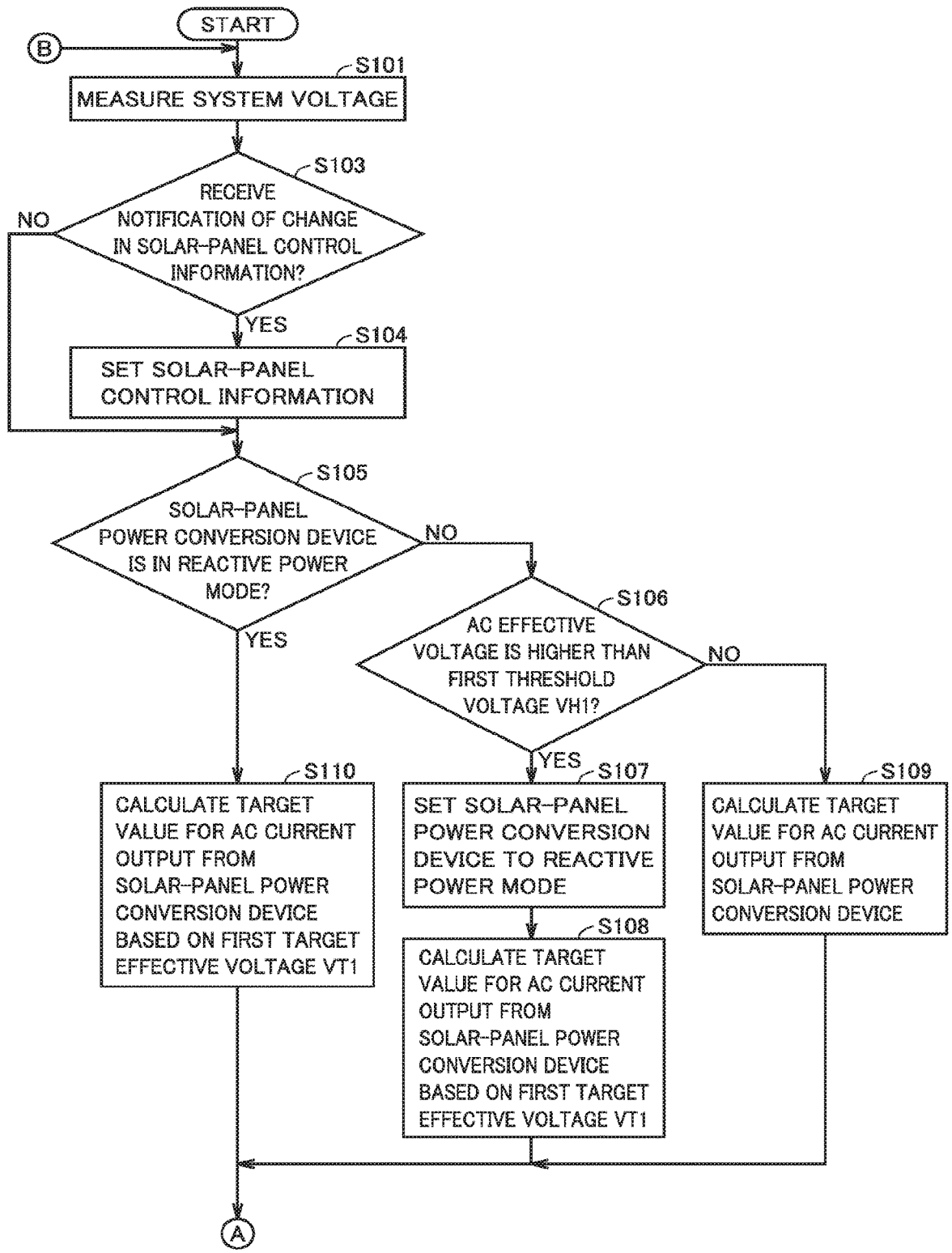
FIG. 12 is a flowchart showing an operation procedure of solar-panel power conversion device 2.
Figure 13:
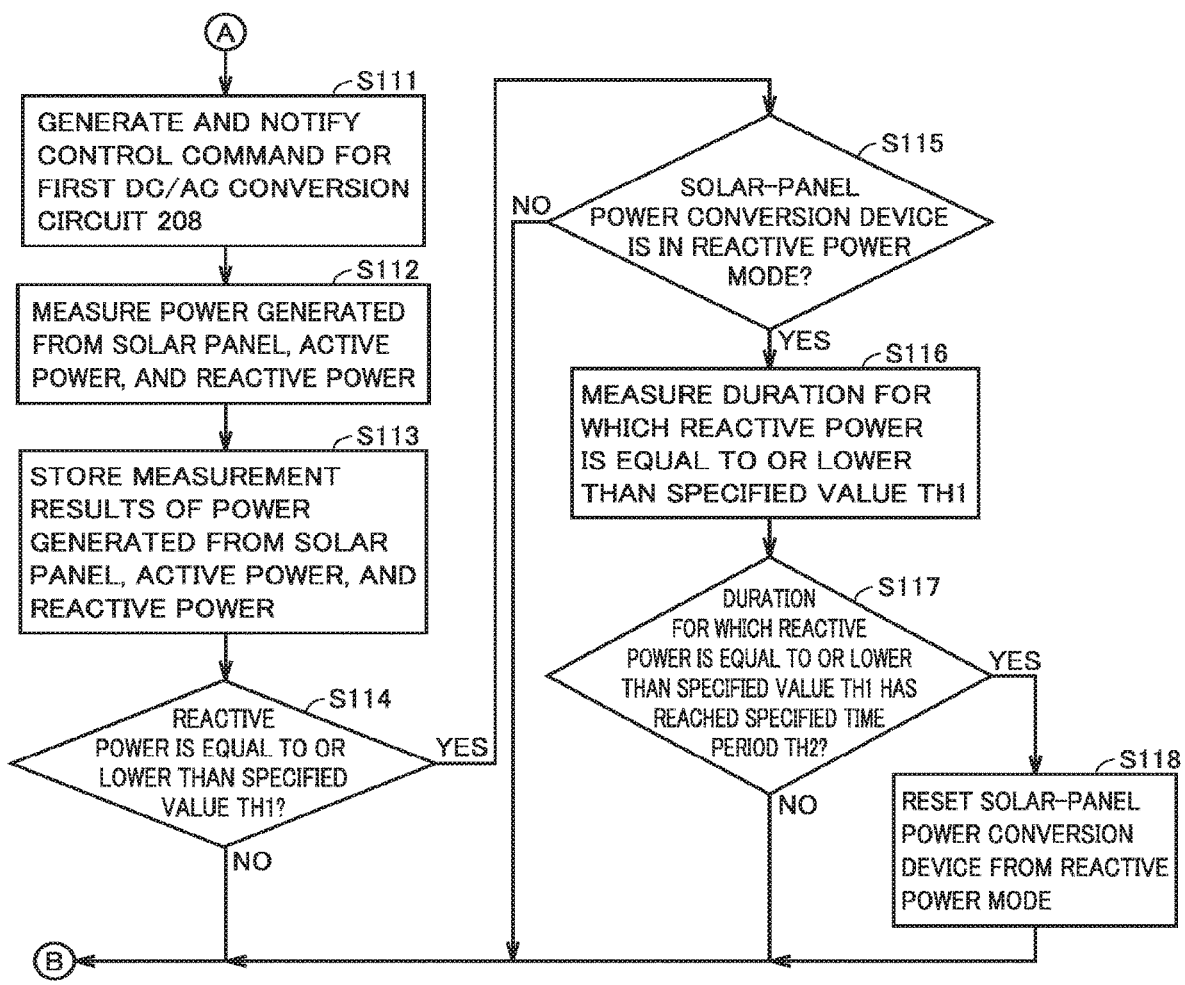
FIG. 13 is a flowchart showing an operation procedure of solar-panel power conversion device 2.

FIGS. 12 and 13 show a flowchart showing an operation procedure of solar-panel power conversion device 2.

At step S101, first control circuit 204 checks whether or not the voltage of solar panel 1 output from voltmeter 201 is higher than a specified value X. If first control circuit 204 determines that the voltage of solar panel 1 is higher than specified value X, first control circuit 204 notifies second control circuit 209 that solar panel 1 can generate power.

Based on the measurement results of the AC voltage of consumer premises distribution system 10 output from voltmeter 210, second control circuit 209 checks whether or not a power failure is occurring in commercial system 17. If it is determined that a power failure is not occurring, the process goes on to step S103.

At step S103, first control circuit 204 checks whether or not a notification of change in solar-panel control information has been received from HEMS 7. If the change notification has not been received from HEMS 7 as a result of the checking (S103: NO), the process goes on to step S105. If the change notification has been received from HEMS 7 (S103: YES), the process goes on to step S104.

At step S104, sixth control circuit 2097 in second control circuit 209 sets, in a register (not shown), new solar-panel control information sent from HEMS 7.

At step S105, sixth control circuit 2097 in second control circuit 209 checks the present control mode of solar-panel power conversion device 2. The control mode of solar-panel power conversion device 2 includes a normal operation mode and a reactive power mode. The normal operation mode is an operation mode in which solar-panel power conversion device 2 outputs no reactive power. The reactive power mode is a mode in which solar-panel power conversion device 2 outputs reactive power. If the present control mode of solar-panel power conversion device 2 is the reactive power mode, the process goes on to step S110. If the present control mode of solar-panel power conversion device 2 is the normal operation mode, the process goes on to step S106.

At step S110, reactive current amplitude calculation circuit 2092 calculates the target amplitude of the reactive current, based on first target effective voltage VT1, and based on the AC effective voltage of consumer premises distribution system 10 calculated by second control circuit 209 based on the measurement result of voltmeter 210 obtained by measuring the AC voltage of consumer premises distribution system 10. Active current amplitude calculation circuit 2094 calculates the target amplitude of the active current, based on the measurement result of voltmeter 206 obtained by measuring the DC voltage on DC bus 205. Reactive current waveform generation circuit 2093 generates the target value for the reactive current based on the target amplitude of the reactive current. Active current waveform generation circuit 2095 generates the target value for the active current based on the target amplitude of the active current. Adder 2096 adds the target value for the reactive current and the target value for the active current, and outputs the target value for the AC current output from solar-panel power conversion device 2.

At step S106, whether to shift the mode of solar-panel power conversion device 2 to the reactive power mode is determined. Specifically, sixth control circuit 2097 in second control circuit 209 calculates the AC effective voltage of consumer premises distribution system 10 based on the measurement result of voltmeter 210 obtained by measuring the AC voltage of consumer premises distribution system 10, and checks whether or not the AC effective voltage is higher than first threshold voltage VH1. If AC effective voltage is higher than first threshold voltage VH1, the process goes on to step S107; whereas if AC effective voltage is equal to or lower than first threshold voltage VH1, the process goes on to step S109.

At step S107, sixth control circuit 2097 sets a reactive power mode flag in a register (not shown) in solar-panel power conversion device 2 to shift to the reactive power mode.

At step S108, reactive current amplitude calculation circuit 2092 calculates the target amplitude of the reactive current, based on first target effective voltage VT1, and based on the AC effective voltage of consumer premises distribution system 10 calculated by second control circuit 209 based on the measurement result of voltmeter 210 obtained by measuring the AC voltage of consumer premises distribution system 10. Active current amplitude calculation circuit 2094 calculates the target amplitude of the active current, based on the measurement result of voltmeter 206 obtained by measuring the DC voltage on DC bus 205. Reactive current waveform generation circuit 2093 generates the target value for the reactive current based on the target amplitude of the reactive current. Active current waveform generation circuit 2095 generates the target value for the active current based on the target amplitude of the active current. Adder 2096 adds the target value for the reactive current and the target value for the active current, and outputs the target value for the AC current output from solar-panel power conversion device 2.

At step S109, active current amplitude calculation circuit 2094 calculates the target amplitude of the active current, based on the measurement result of voltmeter 206 obtained by measuring the DC voltage on DC bus 205. Active current waveform generation circuit 2095 generates the target value for the active current based on the target amplitude of the active current. The target value for the reactive current is zero. The target value for the active current is input to adder 2096, so that adder 2096 outputs the target value for the AC current output from solar-panel power conversion device 2.

The target value for the AC current obtained at step S110, S108, or S109 is input to sixth control circuit 2097.

At step S111, sixth control circuit 2097 generate a control command value for first DC/AC conversion circuit 208 based on the target value for the AC current, and outputs the control command value to first DC/AC conversion circuit 208. When receiving input of the control command value, first DC/AC conversion circuit 208 converts DC power supplied from first DC/DC conversion circuit 203 into AC power and outputs the AC power to consumer premises distribution system 10, based on the input command value.

When the control command value is output to first DC/AC conversion circuit 208, first control circuit 204 calculates, at step S112, the power generated from solar panel 1 based on the measurement results of the voltage of solar panel 1 output from voltmeter 201 and the current of solar panel 1 output from ammeter 202. Second control circuit 209 calculates the active power and reactive power output from solar-panel power conversion device 2 using voltmeter 210 and ammeter 211 installed in consumer premises distribution system 10.

At step S113, second control circuit 209 stores the calculation results from step S112 in a memory (not shown), that is, the power generated from solar panel 1 and the active power and reactive power output from solar-panel power conversion device 2.

At and after step S114, sixth control circuit 2097 in second control circuit 209 determines whether to allow solar-panel power conversion device 2 to continue the reactive power mode.

At step S114, sixth control circuit 2097 determines whether or not the reactive power measured at step S112 is equal to or lower than a specified value TH1. Although the reactive power measured at step S112 is used embodiment 1, the amplitude value of the reactive current output from reactive current amplitude calculation circuit 2092 may be used instead. If the reactive power measured at step S112 is higher than specified value TH1 (S114: NO) the process returns to step S101. If the reactive power measured at step S112 is equal to or lower than specified value TH1 (S114: YES), the process goes on to step S115.

At step S115, sixth control circuit 2097 checks whether or not the present mode of solar-panel power conversion device 2 is the reactive power mode. If solar-panel power conversion device 2 is not in the reactive power mode (S115: NO), the process returns to step S101. On the other hand, if solar-panel power conversion device 2 is in the reactive power mode (S115: YES), the process goes on to step S116.

At step S116, sixth control circuit 2097 measures the duration for which the reactive power is equal to or lower than specified value TH1.

At step S117, sixth control circuit 2097 checks whether or not the duration for which the reactive power is equal to or lower than specified value TH1 has reached a specified time period TH2 or longer. If the duration for which the reactive power is equal to or lower than specified value TH1 has reached specified time period TH2 or longer (S117: YES), the process goes on to step S118. If the duration for which the reactive power is equal to or lower than specified value TH1 has not reached specified time period TH2 or longer (S117: NO), the process returns to step S101.

At step S118, sixth control circuit 2097 clears the reactive power mode flag set in the register (not shown) in solar-panel power conversion device 2 to shift to the normal operation mode.

Next, a brief description is made for the reasons why a check is made at step S117 about whether or not the duration for which the measured reactive power is equal to or lower than specified value TH1 has reached specified time period TH2 or longer.

A power generation system that harnesses renewable energy, represented by solar panel 1, is sometimes subject to sudden changes in power generation. In the case of a smart town, for example, when clouds pass over the sky and cause a sudden change in insolation, solar panels 1 installed in the houses, which concentrate in a narrow area, decrease their power generation substantially simultaneously and thus cause the restraint on the increase in system voltage. However, once the clouds in the sky have gone, solar panels 1 installed in the houses recover their power generation, thus quickly increasing the system voltage. In embodiment 1, in view of the fact that the restraint on the increase in system voltage may also be caused by such a sudden change in insolation, the reactive power output from solar panel 1 is stopped only when the duration for which the reactive power is equal to or lower than specified value TH1 has reached specified time period TH2 or longer.

Further, in embodiment 1, solar-panel power conversion device 2 is configured to determine its own reactive power output. Such a configuration allows effective increase in system voltage. In particular, there is no need to change the control of solar-panel power conversion device 2 depending on the presence or absence of storage-battery power conversion device 4, and when the system voltage increases, the voltage increase in consumer premises distribution system 10 can be reliably restrained by controlling the reactive power from solar-panel power conversion device 2.

Figure 14:
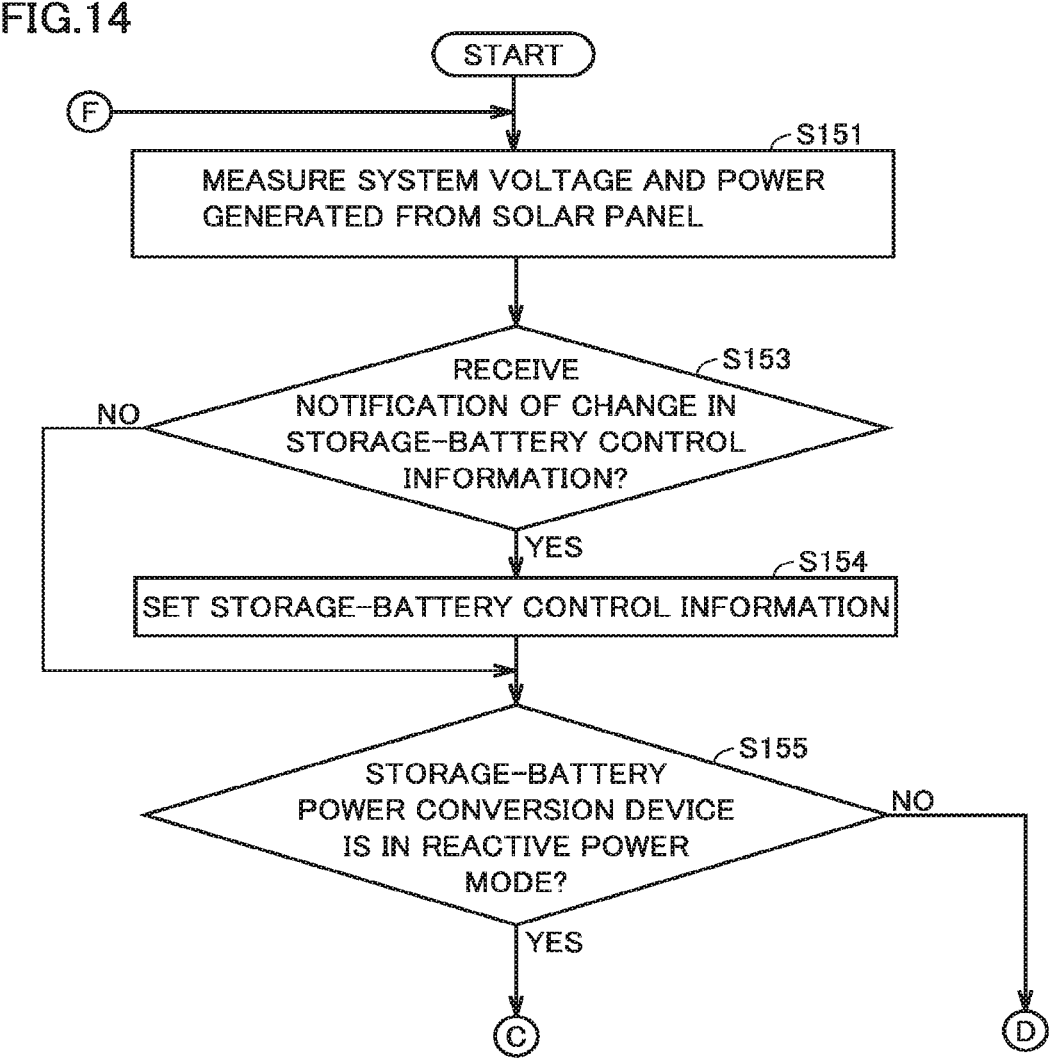
FIG. 14 is a flowchart showing an operation procedure of storage-battery power conversion device 4.
Figure 15:
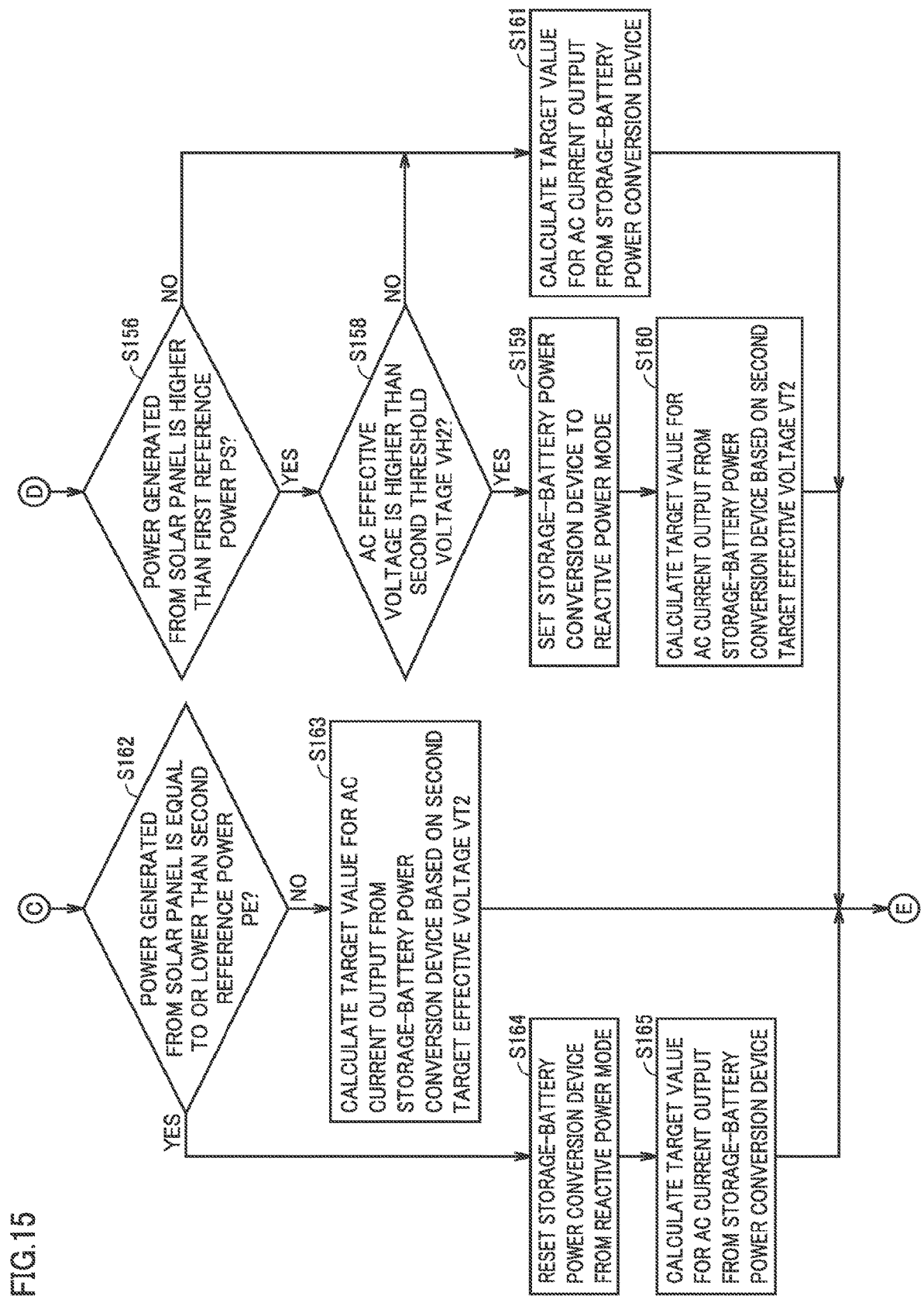
FIG. 15 is a flowchart showing an operation procedure of storage-battery power conversion device 4.
Figure 16:
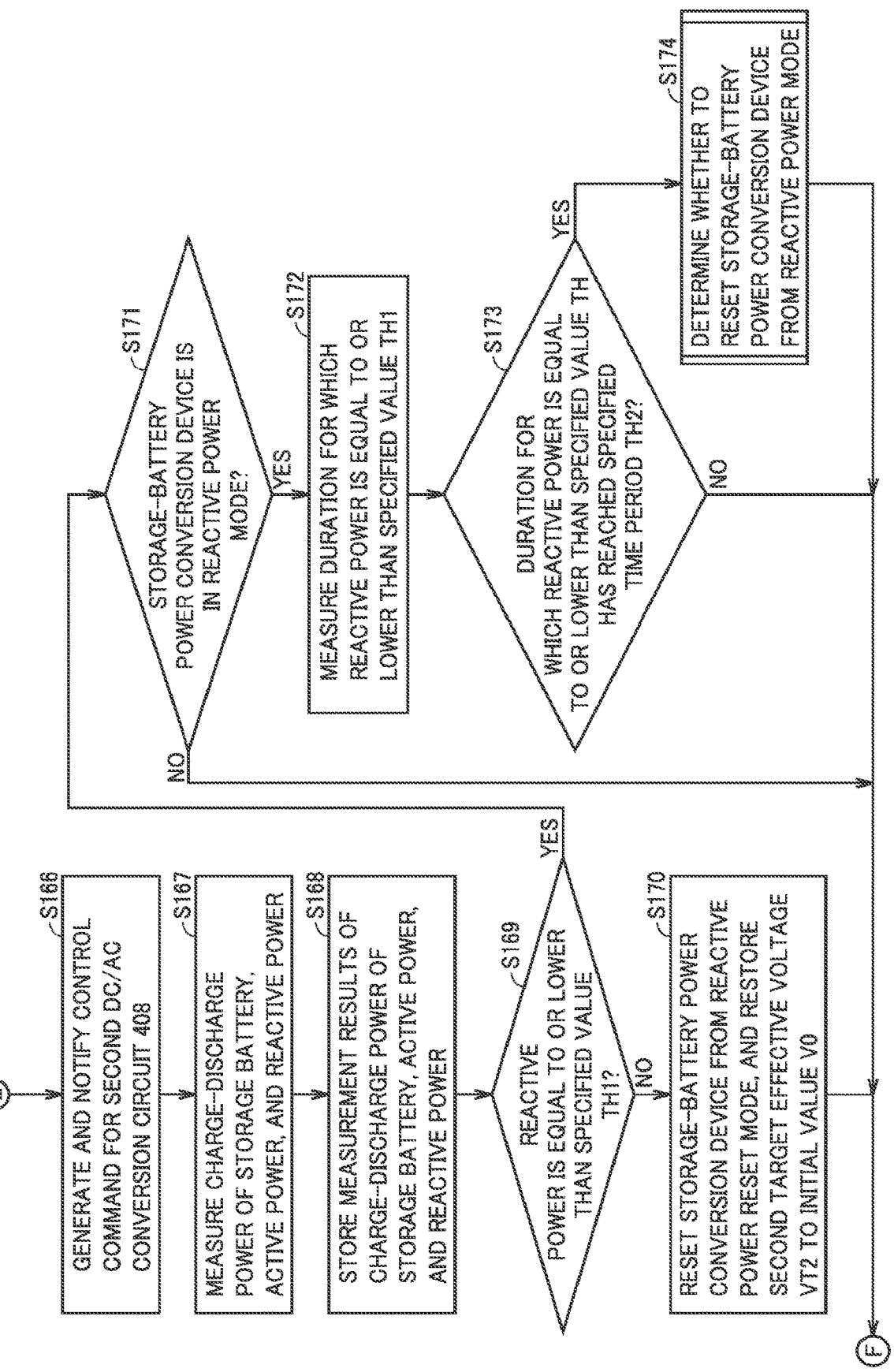
FIG. 16 is a flowchart showing an operation procedure of storage-battery power conversion device 4.

FIGS. 14 to 16 show a flowchart showing an operation procedure of storage-battery power conversion device 4.

At step S151, fourth control circuit 409 acquires a value from voltmeter 410 obtained by measuring the AC voltage of consumer premises distribution system 10, and a value measured by power measurement circuit 61 in distribution switchboard 6. Fourth control circuit 409 calculates the AC effective voltage of consumer premises distribution system 10 based on the output from voltmeter 410. Power measurement circuit 61 in distribution switchboard 6 calculates the active power output from solar-panel power conversion device 2 measured with a voltmeter and ammeter (not shown), as the power generated from solar panel 1. The calculated power is notified to fourth control circuit 409 through signal line 12 at a constant frequency (for example, every 10 seconds).

Upon completing acquiring the measurement results, fourth control circuit 409 checks, at step S153, whether or not a change in storage-battery control information has been notified by HEMS 7. If the change notification has not been received from HEMS 7 as a result of the checking (S153: NO), the process goes on to step S155. If the change notification has been received from HEMS 7 (S153: YES), the process goes on to step S154.

At step S154, eighth control circuit 4097 in fourth control circuit 409 sets, in a register (not shown), new storage-battery control information sent from HEMS 7.

At step S155, fourth control circuit 409 checks the present control mode of storage-battery power conversion device 4. The control mode of storage-battery power conversion device 4 includes a normal operation mode, a reactive power mode, and a sleep mode. The normal operation mode is an operation mode in which storage-battery power conversion device 4 outputs no reactive power. The reactive power mode is a mode in which storage-battery power conversion device 4 outputs reactive power. The sleep mode is a standby mode in which charging and discharging of storage battery 3 is not performed and little power for standby is consumed.

If the present control mode of storage-battery power conversion device 4 is the reactive power mode (S155: YES), the process goes on to step S162. If the present control mode of storage-battery power conversion device 4 is not the reactive power mode (S155: NO), the process goes on to step S156.

At step S162, fourth control circuit 409 primarily determines whether to cancel the reactive power mode. In order to minimize the standby power, the switching losses and conduction losses at storage-battery power conversion device 4, storage-battery power conversion device 4 is not allowed to generate reactive power whenever solar-panel power conversion device 2 can generate reactive power without restraining the power generated from solar panel 1. However, if storage-battery power conversion device 4 switches from the reactive power mode operation to, for example, the sleep mode at the point in time when power generated from solar panel 1 becomes equal to or lower than first reference power PS, the following problems arise. If the power generated from solar panel 1 suddenly increases due to a sudden change in insolation amount, storage-battery power conversion device 4 cannot output reactive power until storage-battery power conversion device 4 switches from the sleep mode to the normal operation mode. This may create the need for, for example, the restraint on the output from solar panel 1 for restraining the voltage increase in the distribution system. If the power generated from solar panel 1 is close to first reference power PS, storage-battery power conversion device 4 may undergo hunting of the operation mode.

Figure 17:
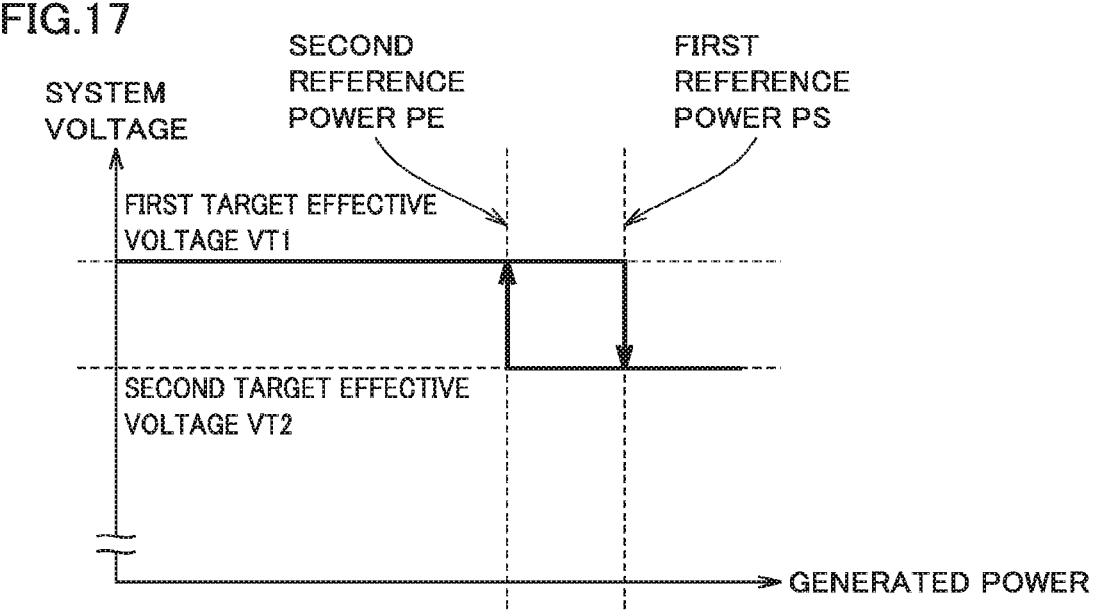
FIG. 17 is a diagram for explaining the conditions for the start and end of the reactive power control for the storage battery.

FIG. 17 is a diagram for explaining the conditions for the start and end of the reactive power control for the storage battery.

As shown in FIG. 17, first reference power PS, based on which storage-battery power conversion device 4 shifts to the reactive power mode, is set to higher than second reference power PE, based on which the reactive power mode is canceled for shifting to the normal operation mode. This causes hysteresis in the mode switching. As shown in FIG. 17, the mode switching is accompanied by the switching between first target effective voltage VT1 and second target effective voltage VT2 of consumer premises distribution system 10. This can reduce the hunting of modes, that is, the fluctuation between the reactive power mode and the normal operation mode. This can eliminate unnecessary turning on and off of a relay (not shown) and other devices, thus preventing the devices from deteriorating.

At step S162, fourth control circuit 409 determines whether or not the power generated from solar panel 1 and output from solar-panel power conversion device 2 is equal to or lower than second reference power PE. If the power generated from solar panel 1 and output from solar-panel power conversion device 2 is equal to or lower than second reference power PE (S162: YES), the process goes on to step S164. If the power generated from solar panel 1 and output from solar-panel power conversion device 2 is higher than second reference power PE (S162: NO), the process goes on to step S163.

At step S164, eighth control circuit 4097 in fourth control circuit 409 clears the reactive power mode flag set in the register (not shown).

If storage-battery power conversion device 4 has been performing charging and discharging, third control circuit 404 changes the target value for the AC voltage of consumer premises distribution system 10 to first target effective voltage VT1, and continues the charge-discharge control for storage battery 3.

On the other hand, if storage-battery power conversion device 4 has not been performing charging and discharging, storage-battery power conversion device 4 shifts to the sleep mode. Specifically, third control circuit 404 stops power supply to a relay (not shown) that connects storage battery 3 and storage-battery power conversion device 4, thereby disconnecting storage battery 3 from storage-battery power conversion device 4. Further, third control circuit 404 stops power supply except for a partial circuit in eighth control circuit 4097 that communicates with HEMS 7, or third control circuit 404 shifts the mode to a low power consumption mode. In the low power consumption mode, a digital circuit, such as a central processing unit (CPU), has a lower frequency clock input. The flowchart in FIG. 15 shows a case in which charging and discharging of storage battery 3 have been performed and thus the mode is not shifted to the sleep mode. If the mode is shifted to the sleep mode, the process in the flowchart shown in FIG. 15 ends upon shifting to the sleep mode. If the instruction for cancelling the sleep mode is input from HEMS 7, the mode is restored to the normal operation mode by normally starting up storage-battery power conversion device 4 and turning on the relay (not shown) that connects storage battery 3 and storage-battery power conversion device 4, as described above.

At step S165, eighth control circuit 4097 causes active current amplitude calculation circuit 4094 to calculate the target amplitude of the active current based on the measurement result of voltmeter 406 obtained by measuring the DC voltage on DC bus 405. Active current waveform generation circuit 4095 generates the target value for the active current based on the target amplitude of the active current. Adder 4096 receives input of the target value for the active power, and outputs the target value for the AC current output from storage-battery power conversion device 4. The amount of charge-discharge power is controlled by third control circuit 404 based on the amount of charge-discharge power notified by HEMS 7.

At step S163, reactive current amplitude calculation circuit 4092 calculates the target amplitude of the reactive current, based on second target effective voltage VT2, and based on the AC effective voltage of consumer premises distribution system 10 calculated by fourth control circuit 409 based on the measurement result of voltmeter 410 obtained by measuring the AC voltage of consumer premises distribution system 10. Active current amplitude calculation circuit 4094 calculates the target amplitude of the active current, based on the measurement result of voltmeter 406 obtained by measuring the DC voltage on DC bus 405. Reactive current waveform generation circuit 4093 generates the target value for the reactive current based on the target amplitude of the reactive current. Active current waveform generation circuit 4095 generates the target value for the active current based on the target amplitude of the active current. Adder 4096 adds the target value for the reactive current and the target value for the active current, and outputs the target value for the AC current output from storage-battery power conversion device 4.

At step S156, fourth control circuit 409 determines whether or not the power generated from solar panel 1 measured by power measurement circuit 61 in distribution switchboard 6 is higher than first reference power PS. If the power generated from solar panel 1 is higher than first reference power PS (S156: YES), the process goes on to step S158. If the power generated from solar panel 1 is equal to or lower than first reference power PS (S156: NO), the process goes on to step S161.

At step S158, fourth control circuit 409 checks whether or not the AC effective voltage of consumer premises distribution system 10 is higher than second threshold voltage VH2. If the AC effective voltage of consumer premises distribution system 10 is higher than second threshold voltage VH2 (S158: YES), the process goes on to step S159. If the AC effective voltage of consumer premises distribution system 10 is equal to or lower than second threshold voltage VH2 (S158: NO), the process goes on to step S161.

At step S159, eighth control circuit 4097 in fourth control circuit 409 sets a reactive power mode flag in a register (not shown) to shift to the reactive power mode.

At step S160, reactive current amplitude calculation circuit 4092 calculates the target amplitude of the reactive current, based on second target effective voltage VT2, and based on the AC effective voltage of consumer premises distribution system 10 calculated by fourth control circuit 409 based on the measurement result of voltmeter 410 obtained by measuring the AC voltage of consumer premises distribution system 10. Active current amplitude calculation circuit 4094 calculates the target amplitude of the active current, based on the measurement result of voltmeter 406 obtained by measuring the DC voltage on DC bus 405. Reactive current waveform generation circuit 4093 generates the target value for the reactive current based on the target amplitude of the reactive current. Active current waveform generation circuit 4095 generates the target value for the active current based on the target amplitude of the active current. Adder 4096 adds the target value for the reactive current and the target value for the active current, and outputs the target value for the AC current output from storage-battery power conversion device 4.

At step S161, active current amplitude calculation circuit 4094 calculates the target amplitude of the active current, based on the measurement result of voltmeter 406 obtained by measuring the DC voltage on DC bus 405. Active current waveform generation circuit 4095 generates the target value for the active current based on the target amplitude of the active current. The target value for the active current is output through adder 4096 as the target value for the AC current output from storage-battery power conversion device 4. The amount of charge-discharge power is controlled by third control circuit 404 based on the amount of charge-discharge power notified by HEMS 7.

When the target value for the AC current is acquired at step S165, S163, S160, or S161, the process goes on to step S166.

At step S166, eighth control circuit 4097 in fourth control circuit 409 generates the control command value for second DC/AC conversion circuit 408, and outputs the control command value to second DC/AC conversion circuit 408. When receiving input of the control command value, second DC/AC conversion circuit 408 performs control based on the input command value as follows: for discharging, second DC/AC conversion circuit 408 converts DC power supplied from second DC/DC conversion circuit 403 into AC power and outputs the AC power to consumer premises distribution system 10; for charging, second DC/AC conversion circuit 408 converts consumer premises distribution system 10 into DC power to charge storage battery 3 through second DC/DC conversion circuit 403.

When the control command value is output to second DC/AC conversion circuit 408, third control circuit 404 calculates, at step S167, the charge-discharge power of storage battery 3 based on the measurement results of the voltage of storage battery 3 output from voltmeter 401 and the charge-discharge current of storage battery 3 output from ammeter 402. Fourth control circuit 409 calculates the active power and reactive power output from the charge-discharge power of storage battery 3, using voltmeter 410 and ammeter 411 installed in consumer premises distribution system 10.

At step S168, fourth control circuit 409 stores the calculation results from step S167 in a memory (not shown), that is, the charge-discharge power of storage battery 3 and the active power and reactive power output from the charge-discharge power of storage battery 3.

At and after step S169, eighth control circuit 4097 in fourth control circuit 409 determines whether to continue the reactive power mode.

At step S169, eighth control circuit 4097 determines whether or not the reactive power measured at S167 is equal to or lower than specified value TH1. If the reactive power is equal to or lower than specified value TH1 (S169: YES), the process goes on to step S171. If the reactive power is higher than specified value TH1 (S169: NO), the process goes on to step S170. Although the reactive power measured at step S167 is used in embodiment 1, for example, the amplitude of the reactive current output from reactive current amplitude calculation circuit 4092 may be used instead, as with solar panel 1.

At step S170, if a reactive power reset mode flag for storage-battery power conversion device 4 has been set in a register (not shown), eighth control circuit 4097 clears the reactive power reset mode flag for storage-battery power conversion device 4 to restore second target effective voltage VT2 to an initial value V0. Then, the process returns to step S151.

At step S171, eighth control circuit 4097 checks whether or not the present mode of storage-battery power conversion device 4 is the reactive power mode. If the present mode of storage-battery power conversion device 4 is not the reactive power mode (S171: NO), the process returns to step S151.

If the present mode of storage-battery power conversion device 4 is the reactive power mode (S171: YES), the process goes on to step S172.

At step S172, eighth control circuit 4097 measures the duration for which the reactive power is equal to or lower than specified value TH1.

At step S173, eighth control circuit 4097 checks whether or not the duration for which the reactive power is equal to or lower than specified value TH1 has reached specified time period TH2 or longer. If the duration for which the reactive power is equal to or lower than specified value TH1 has reached specified time period TH2 or longer (S173: YES), the process goes on to step S174. If the duration for which the reactive power is equal to or lower than specified value TH1 has not reached specified time period TH2 or longer (S173: NO), the process returns to step S151.

At step S174, eighth control circuit 4097 determines whether to reset storage-battery power conversion device 4 from the reactive power mode.

Figure 18:
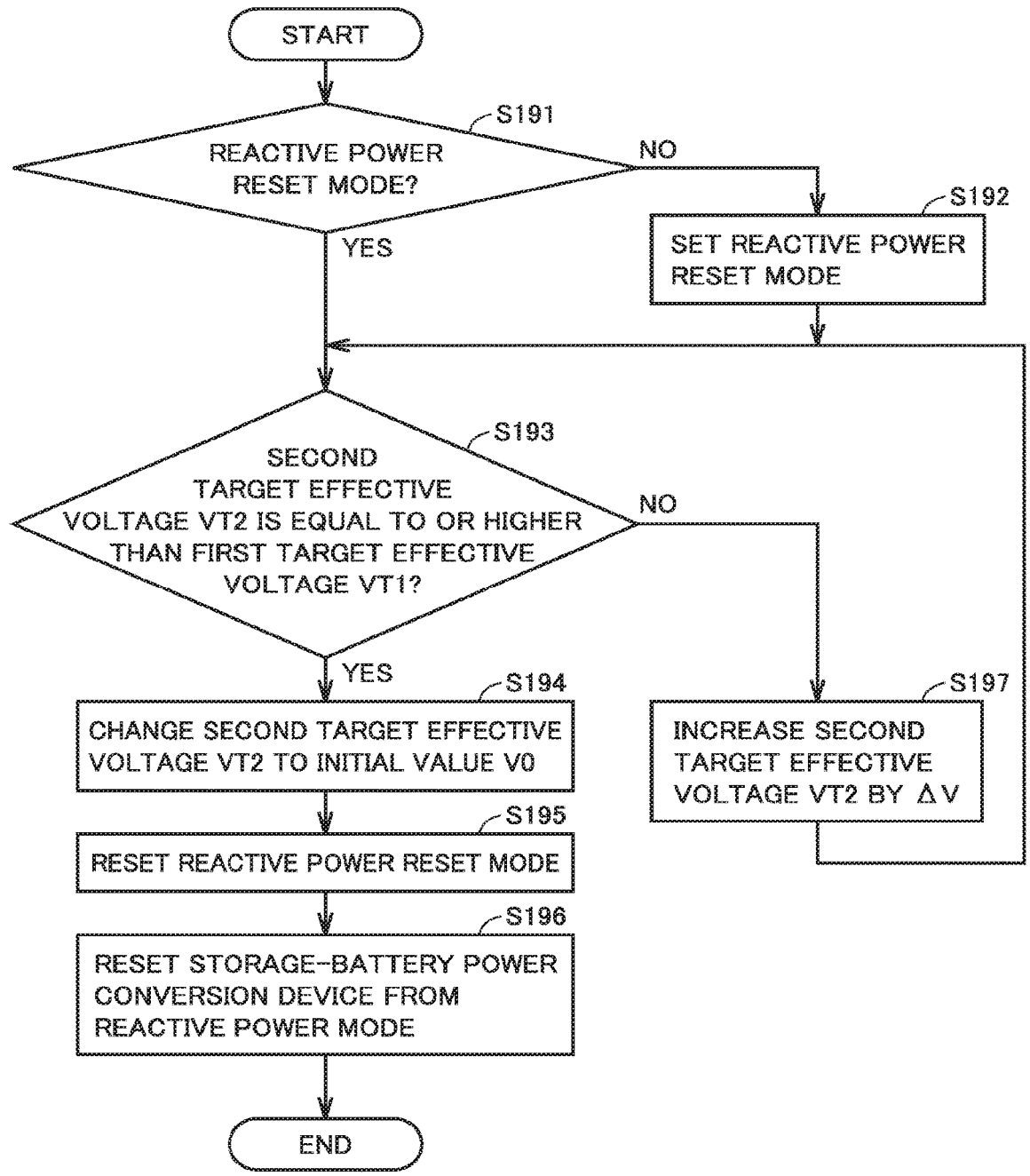
FIG. 18 is a flowchart showing a procedure for determining whether to reset storage-battery power conversion device 4 from the reactive power mode at step S174 in FIG. 16.
Figure 19:
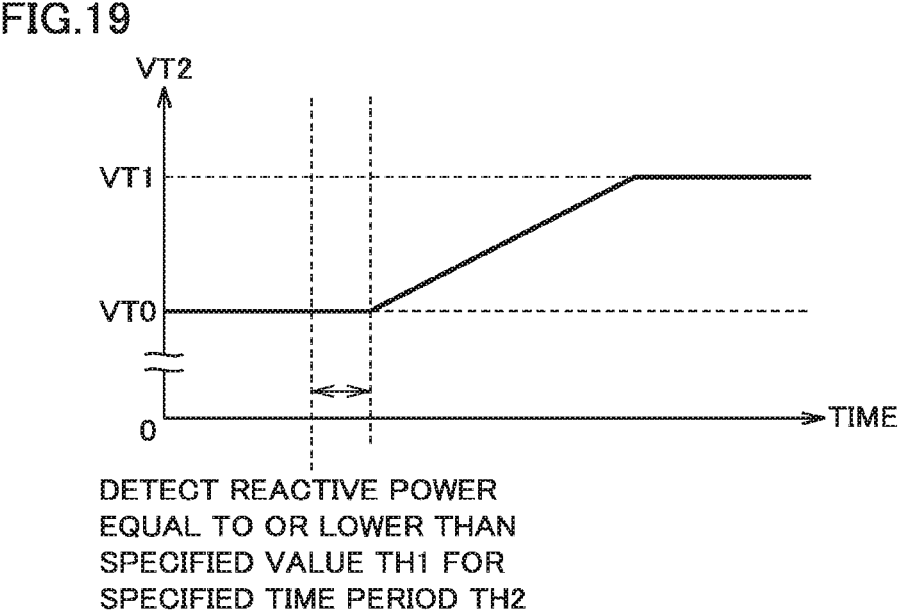
FIG. 19 schematically shows a method for determining whether to reset storage-battery power conversion device 4 from the reactive power mode.

FIG. 18 is a flowchart showing a procedure for determining whether to reset storage-battery power conversion device 4 from the reactive power mode at step S174 in FIG. 16. FIG. 19 schematically shows a method for determining whether to reset storage-battery power conversion device 4 from the reactive power mode.

As shown in FIG. 19, eighth control circuit 4097 cancels the reactive power mode of storage-battery power conversion device 4 not immediately but by gradually changing the target value for the voltage of consumer premises distribution system 10 for controlling the amplitude of the reactive current, from second target effective voltage VT2 to first target effective voltage VT1.

At step S191, eighth control circuit 4097 checks whether or not the present mode of storage-battery power conversion device 4 has shifted to a reactive power reset mode. If the present mode of storage-battery power conversion device 4 has not shifted to the reactive power reset mode (S191: NO), the process goes on to step S192.

At step S192, eighth control circuit 4097 sets a reactive power reset mode flag in a register (not shown).

After step S192 or if step S191 is determined to be NO, the process goes on to step S193.

At step S193, eighth control circuit 4097 checks whether or not second target effective voltage VT2 is equal to or higher than first target effective voltage VT1. If second target effective voltage VT2 is equal to or higher than first target effective voltage VT1 (S193: YES), the process goes on to step S194. If second target effective voltage VT2 is less than first target effective voltage VT1 (S193: NO), the process goes on to step S197.

At step S194, eighth control circuit 4097 restores second target effective voltage VT2 to initial value V0.

At step S195, eighth control circuit 4097 resets the reactive power reset mode flag for storage-battery power conversion device 4 set in the register (not shown).

At step S196, eighth control circuit 4097 resets the reactive power mode flag for storage-battery power conversion device 4 set in the register (not shown). Thus, storage-battery power conversion device 4 ends the reactive power mode.

At step S197, eighth control circuit 4097 increases second target effective voltage VT2 for use in reactive current amplitude calculation circuit 4092 by a certain amount ΔV. Then, the process returns to step S193.

By controlling second target effective voltage VT2, the reactive power mode can be continued even if the system voltage temporarily drops to a lower value due to, for example, a sudden change in the solar panel 1 power generation or a sudden change in the load 5 power consumption. When the insolation increases again, the restraint on the system voltage using reactive power can be immediately carried out. Also, storage-battery power conversion device 4 can reliably address a temporary drop in system voltage due to a sudden change in insolation or a sudden change in load, and can reliably determine whether to cancel the reactive power mode.

As described above, in the present embodiment, based on the power generated from solar panel 1 and output from solar-panel power conversion device 2, in the situation in which the active power output from solar-panel power conversion device 2 will not be restrained when solar-panel power conversion device 2 outputs the reactive power with the minimum power factor specified in the Grid-interconnection Code, solar-panel power conversion device 2 outputs reactive power. In this situation, storage-battery power conversion device 4 is not used. Accordingly, the voltage increase in consumer premises distribution system 10 can be restrained without unnecessary power consumption.

In the situation in which the active power output from solar-panel power conversion device 2 is expected to be restrained, storage-battery power conversion device 4 preferentially outputs reactive power. In this situation, solar-panel power conversion device 2 outputs only active power. Thus, all the power generated from solar panel 1 can be output from solar-panel power conversion device 2 without being restrained.

In the situation in which even the maximum output of reactive power from storage-battery power conversion device 4 cannot restrain the AC effective voltage of the system voltage of consumer premises distribution system 10, solar-panel power conversion device 2 also generates reactive power. Thus, the increase in system voltage can be restrained.

Since the distributed power supplies placed in each consumer premises can restrain the voltage increase in commercial system 17, commercial system 17 does not require an expensive facility for stabilizing the distribution system, such as an SVC or system storage battery. If any, the facility for stabilizing the distribution system can be reduced in capacity.

Embodiment 2

In embodiment 2, second threshold voltage VH2 is switched in accordance with the power generated from solar panel 1. When the power generated from solar panel 1 is so low that the output is not easily restrained, second threshold voltage VH2 is set higher. This allows storage-battery power conversion device 4 to more easily shift to the standby mode, thus reducing the standby power. On the other hand, when the power generated from solar panel 1 is so high that the output is easily restrained and requires the restraint on the system voltage using reactive power, second threshold voltage VH2 is set lower. This allows storage-battery power conversion device 4 to reliably generate reactive power.

Specifically, when the power generated from solar panel 1 measured by power measurement circuit 61 in distribution switchboard 6 is equal to or higher than a threshold value THX, eighth control circuit 4097 sets second threshold voltage VH2 to V1. When the power generated from solar panel 1 measured by power measurement circuit 61 in distribution switchboard 6 is less than threshold value THX, eighth control circuit 4097 sets second threshold voltage VH2 to V2. V2>V1 is satisfied.

Alternatively, eighth control circuit 4097 may linearly decrease second threshold voltage VH2 for the power generated from solar panel 1 measured by power measurement circuit 61 in distribution switchboard 6.

Embodiment 3

In embodiment 1, second target effective voltage VT2 is set lower than first target effective voltage VT1. However, this is not mandatory.

In the present embodiment, HEMS 7 sets first target effective voltage VT1 lower than second target effective voltage VT2. With such a setting, when solar-panel power conversion device 2 starts generating reactive power, the reactive power is supplied to consumer premises distribution system 10 preferentially over the reactive power from storage-battery power conversion device 4. This allows prompt start of the restraint on the output from solar panel 1.

In general, when the reactive power output from storage-battery power conversion device 4 cannot restrain the increase in system voltage, the power generated from solar panel 1 is basically too much. In this case, therefore, the reactive power control of storage-battery power conversion device 4 would not be able to restrain the increase in system voltage. To address this, first target effective voltage VT1 is set lower than second target effective voltage VT2. Thus, when the reactive power control of storage-battery power conversion device 4 cannot restrain the increase in system voltage, solar-panel power conversion device 2 preferentially outputs reactive power, so as to spontaneously restrain the output from solar panel 1. This allows prompt stabilization of the voltage in the distribution system.

Specifically, when the system voltage increases and the output from solar panel 1 needs to be restrained promptly, HEMS 7 sets first target effective voltage VT1 lower than second target effective voltage VT2 as in the present embodiment. On the other hand, when the distribution system has a margin and the power generation from solar panel 1 is prioritized, HEMS 7 sets second target effective voltage VT2 lower than first target effective voltage VT1 as in embodiment 1. In an intermediate condition, the first and second system voltage target values may be the same.

Variations

The present invention is not limited to the above-described embodiments, but may include the following variations.

(1) In embodiment 1, energy creation apparatus 111 and energy storage apparatus 333 are installed in each consumer premises, but this is not mandatory. Each consumer premises may include either one of them.

In this case, consumer equipment 18 including only energy creation apparatus 111 is paired with consumer equipment 18 including only energy storage apparatus 333.

For example, if consumer equipment 18-1 includes energy creation apparatus 111 and consumer equipment 18-2 includes energy storage apparatus 333, consumer equipment 18-1 may be paired with consumer equipment 18-2. Storage-battery power conversion device 4 in consumer equipment 18-2 may acquire the measurement results of the solar panel 1 power generation output from power measurement circuit 61 in distribution switchboard 6 in consumer equipment 18-1 through HEMS 7 and CEMS 15.

(2) In embodiment 1, energy creation apparatus 111 includes solar panel 1 as a distributed power supply that harnesses natural energy, but this is not mandatory. For example, energy creation apparatus 111 may include a wind generator or a fuel cell.

(3) In embodiment 1, a stationary battery is used as storage battery 3, but this is not mandatory. As storage battery 3, an electric vehicle battery may be used.

(4) If a lithium-ion battery is used as storage battery 3, the battery may have a built-in battery management unit that manages the amount of stored power, whether to permit charging and discharging, and the maximum charge current for charging etc., and notifies them to third control circuit 404.

(5) In embodiment 1, energy storage apparatus 333 includes storage battery 3, but this is not mandatory. Energy storage apparatus 333 may include a power conversion device connected to an electric vehicle, hybrid vehicle, or fuel-cell vehicle. In this case, however, the electric vehicle, hybrid vehicle, or fuel-cell vehicle do not necessarily have to be connected to the power conversion device because it has only to generate reactive power.

(6) Embodiment 1 is on the assumption that storage battery 3 is a single stationary storage battery, but this is not mandatory. Two or more storage batteries connected together, or a storage battery connected to another distributed power supply device may be used as storage battery 3. If two or more storage batteries connected together are used, one or more of them may be a power conversion device connected to an electric vehicle, hybrid vehicle, or fuel-cell vehicle.

(7) In embodiment 1, various types of control are implemented by hardware, but this is not mandatory. All or part of the circuits for the various types of control may be implemented by software operating on a CPU.

(8) In embodiment 1, at step S197 in FIG. 18, second target effective voltage VT2 is controlled to approach first target effective voltage VT1 in steps of a prescribed voltage, but this is not mandatory. Second target effective voltage VT2 may be controlled to approach first target effective voltage VT1 based on a predetermined time.

(9) In embodiment 1, the AC voltage at interconnection point N is detected by detecting the AC voltage of consumer premises distribution system 10, but this is not mandatory. For example, the AC voltage input to smart meter 8, the AC voltage measured just under pole-mount transformer 9, or the voltage of commercial system 17 may be determined as the AC voltage at interconnection point N.

(10) In embodiment 1, storage-battery power conversion device 4 acquires the information that represents first reference power PS included in the storage-battery control information sent from CEMS 15, but this is not mandatory.

Storage-battery power conversion device 4 may calculate first reference power PS based on the information acquired from CEMS 15 that represents the rated power of solar-panel power conversion device 2 and the power factor specified in the Grid-interconnection Code.

(11) In embodiment 1, at steps S162 and S156 in FIG. 15, power measurement circuit 61 in distribution switchboard 6 calculates, as the power generated from solar panel 1, the active power output from solar-panel power conversion device 2 measured with a voltmeter and ammeter (not shown). This is, however, not mandatory. The effective power output from solar-panel power conversion device 2 (e.g., the mean value in 10 seconds) may be calculated as the power generated from solar panel 1. In this case, first reference power PS and second reference power PE also need to be changed. Alternatively, first control circuit 204 may calculate the power generated from solar panel 1 based on the measurement results of the voltage of solar panel 1 output from voltmeter 201 and the current of solar panel 1 output from ammeter 202.

The above disclosure also includes the following invention.

(Claim A)

A distributed power supply system comprising a plurality of distributed power supplies each of which is connected to a commercial system at an interconnection point, wherein each of the plurality of distributed power supplies includes an energy creation apparatus and an energy storage apparatus, the energy creation apparatus includes an energy creation device, and a first power conversion device to convert DC power from the energy creation device into AC power, the energy storage apparatus includes a storage battery, and a second power conversion device to convert DC power from the storage battery into AC power, the first power conversion device controls an output of reactive power so that, when an AC voltage effective value at the interconnection point is higher than a first threshold voltage, a voltage at the interconnection point matches a first target effective voltage, and the second power conversion device controls an output of reactive power so that, when power generated from the energy creation apparatus is higher than a first reference power and the AC voltage effective value at the interconnection point is higher than a second threshold voltage, the voltage at the interconnection point matches a second target effective voltage.

(Claim B)

The distributed power supply system according to claim A, wherein, when the power generated from the energy creation apparatus is equal to or lower than the first reference power, the second power conversion device does not cause the storage battery to output reactive power.

(Claim C)

The distributed power supply system according to claim A, wherein the first reference power is a numerical value equal to or lower than a value obtained by multiplying a rated power of the first power conversion device by a certain value, where Grid-interconnection Code specifies that a power factor is equal to or higher than the certain value.

(Claim D)

The distributed power supply system according to claim A, wherein the first threshold voltage is higher than the second threshold voltage.

(Claim E)

The distributed power supply system according to claim A, wherein the first power conversion device calculates a target amplitude of a reactive current based on a difference between the AC voltage effective value and the first target effective voltage, the second power conversion device calculates a target amplitude of a reactive current based on a difference between the AC voltage effective value and the second target effective voltage, and the second target effective voltage is lower than the first target effective voltage.

(Claim F)

The distributed power supply system according to claim A, wherein the first power conversion device calculates a target amplitude of a reactive current based on a difference between the AC voltage effective value and the first target effective voltage, the second power conversion device calculates a target amplitude of a reactive current based on a difference between the AC voltage effective value and the second target effective voltage, and the second target effective voltage is higher than the first target effective voltage.

(Claim G)

The distributed power supply system according to claim A, wherein, when the power generated from the energy creation apparatus changes to a power equal to or lower than a second reference power lower than the first reference power while the storage battery is outputting the reactive power, the second power conversion device causes the storage battery to stop outputting the reactive power.

(Claim H)

The distributed power supply system according to claim G, wherein the first power conversion device acquires first control information sent from a community energy management system (CEMS), the first control information including the first threshold voltage and the first target effective voltage, and the second power conversion device acquires second control information sent from the CEMS, the second control information including the first reference power, the second reference power, the second threshold voltage, and the second target effective voltage.

(Claim I)

The distributed power supply system according to claim H, wherein the energy creation apparatus and the energy storage apparatus are installed in each consumer house, and the first control information and the second control information sent from the CEMS differ depending on the consumer house.

(Claim J)

The distributed power supply system according to claim A, wherein the second power conversion device gradually changes the second target effective voltage to the first target effective voltage in steps of a prescribed voltage when a duration for which the reactive power output from the energy storage apparatus is equal to or lower than a specified value has reached a specified time period.

(Claim K)

The distributed power supply system according to claim A, wherein the second threshold voltage changes in accordance with the power generated from the energy creation apparatus.

It should be construed that the embodiments disclosed herein are by way of example in every respect, not by way of limitation. The scope of the present invention is defined not by the above description but by the terms of the claims, and is intended to include any modification within the meaning and scope equivalent to the terms of the claims.

REFERENCE SIGNS LIST

1: solar panel; 2: solar-panel power conversion device; 3: storage battery; 4: storage-battery power conversion device; 5: load; 6: distribution switchboard; 7: HEMS; 8: smart meter; 9: pole-mount transformer; 10: consumer premises distribution system; 11: consumer premises communication network; 12: signal line; 13: outside premises communication network; 14: distribution system; 15: CEMS; 17: commercial system; 18: consumer equipment; 19: section; 51: EcoCute; 52: air conditioner; 53: refrigerator; 54: luminaire; 55: IH cooker; 61: power measurement circuit; 111: energy creation apparatus; 201, 206, 210, 401, 406, 410: voltmeter; 202, 207, 211, 402, 407, 411: ammeter; 203: first DC/DC conversion circuit; 204: first control circuit; 205, 405: DC bus; 208: first DC/AC conversion circuit; 209: second control circuit; 333: energy storage apparatus; 403: second DC/DC conversion circuit; 404: second control circuit; 408: second DC/AC conversion circuit; 409: fourth control circuit; 900: interconnection line; 2041: MPPT control circuit; 2042: voltage control circuit; 2043, 4043: switching circuit; 2044: fifth control circuit; 2091, 4091: phase detection circuit; 2092, 4092: reactive current amplitude calculation circuit; 2093, 4093: reactive current waveform generation circuit; 2094, 4094: active current amplitude calculation circuit; 2095, 4095: active current waveform generation circuit; 2096, 4096: adder; 2097: sixth control circuit; 4041: charge control circuit; 4042: discharge control circuit; 4044: seventh control circuit; 4097: eighth control circuit

The invention claimed is:

1. A distributed power supply system in which a plurality of distributed power supplies each including an energy creation apparatus are connected to a distribution system at one interconnection point so as to supply power to a power system, at least one of the plurality of distributed power supplies including a storage battery, and an inverter to convert DC power from the storage battery into AC power, the distributed power supply system comprising:

a voltage meter to measure an AC voltage at the interconnection point;

a power generation meter to measure power generated from the energy creation apparatus; and a controller to control the inverter to convert DC power from the storage battery into AC power, wherein when the controller controls the inverter, the controller has a first system voltage target value to be used when the AC voltage at the interconnection point is within a prescribed range, a second system voltage target value to be used to determine whether to output reactive power from the inverter for restraining an increase in the AC voltage at the interconnection point, and a first system voltage threshold voltage to be used to determine whether to use the inverter to control a system voltage, based on an output from the power generation meter, and when the output from the power generation meter is equal to or higher than a prescribed value and an output from the voltage meter is higher than the first system voltage threshold voltage, the controller controls an output of the reactive power from the inverter so that the system voltage matches the second system voltage target value.

2. The distributed power supply system according to claim 1, wherein, when the output of the reactive power from the inverter becomes equal to or lower than a prescribed value while the controller is controlling the output of the reactive power from the inverter to achieve the second system voltage target value, the controller performs control so that the second system voltage target value gradually approaches the first system voltage target value in steps of a prescribed voltage.

3. The distributed power supply system according to claim 1, wherein the controller performs control so that the first system voltage threshold voltage changes based on the output from the power generation meter.

4. The distributed power supply system according to claim 1, wherein
- the controller includes a communication interface to communicate with an external component, and
- when the first system voltage target value is input from the communication interface, the controller uses the input first system voltage target value to control the inverter.

5. The distributed power supply system according to claim 4, wherein the controller captures, from the communication interface, a condition for determining the first system voltage threshold voltage and the second system voltage target value.

6. The distributed power supply system according to claim 1, wherein
- the controller includes a conversion-device-capacity capturing circuitry to capture a conversion device capacity of the energy creation apparatus connected to the distribution system, and
- the controller performs control to generate the first system voltage threshold voltage and the second system voltage target value based on an output from the conversion-device-capacity capturing circuitry and the first system voltage target value.

* * * * *